(12) United States Patent
Cerwin

(10) Patent No.: US 8,069,579 B2
(45) Date of Patent: *Dec. 6, 2011

(54) TRAIN RAIL ALIGNMENT AND DISTANCE SYSTEM

(76) Inventor: John Cerwin, Gurnee, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/018,408

(22) Filed: Jan. 31, 2011

(65) Prior Publication Data

US 2011/0126418 A1 Jun. 2, 2011

Related U.S. Application Data

(63) Continuation of application No. 12/575,678, filed on Oct. 8, 2009, now Pat. No. 7,900,368.

(60) Provisional application No. 61/104,726, filed on Oct. 11, 2008.

(51) Int. Cl.
*G01D 21/00* (2006.01)

(52) U.S. Cl. .............................. 33/645; 33/287; 33/651.1

(58) Field of Classification Search .................... 33/338, 33/1 Q, 286, 287, 613, 645, 651, 651.1, 523.1, 33/523.2
See application file for complete search history.

(56) References Cited

U.S. PATENT DOCUMENTS

| | | | | |
|---|---|---|---|---|
| 4,497,255 A | * | 2/1985 | Theurer | 104/8 |
| 5,671,540 A | * | 9/1997 | Davis | 33/287 |
| 5,848,476 A | * | 12/1998 | Grady | 33/1 Q |
| 6,189,224 B1 | * | 2/2001 | Theurer et al. | 33/338 |
| 7,428,781 B2 | * | 9/2008 | Wickhart | 33/286 |
| 7,469,479 B2 | * | 12/2008 | Jager | 33/1 Q |
| 2004/0173033 A1 | * | 9/2004 | Gilbert | 73/862 |
| 2010/0088914 A1 | * | 4/2010 | Cerwin | 33/645 |

* cited by examiner

*Primary Examiner* — Yaritza Guadalupe
(74) *Attorney, Agent, or Firm* — Christopher Wood; Premier Law Group, PLLC

(57) ABSTRACT

A train rail alignment and distance system. The train rail alignment and distance system is a durable, highly accurate, portable electronic measurement system that is used for determining both rail inclination and distance between substantially parallel train rail sections during the processes of railway construction, maintenance, and monitoring. The system is designed to work accurately across a wide temperature range and in extreme weather conditions. It is designed to be easily manufactured, configured and maintained. The system also includes several optional integrated features and functions such as: field calibration, factory configuration, GPS and/or USB integration, PC and/or Internet-based communications, and data logging, data storage, and data analysis capabilities.

3 Claims, 37 Drawing Sheets

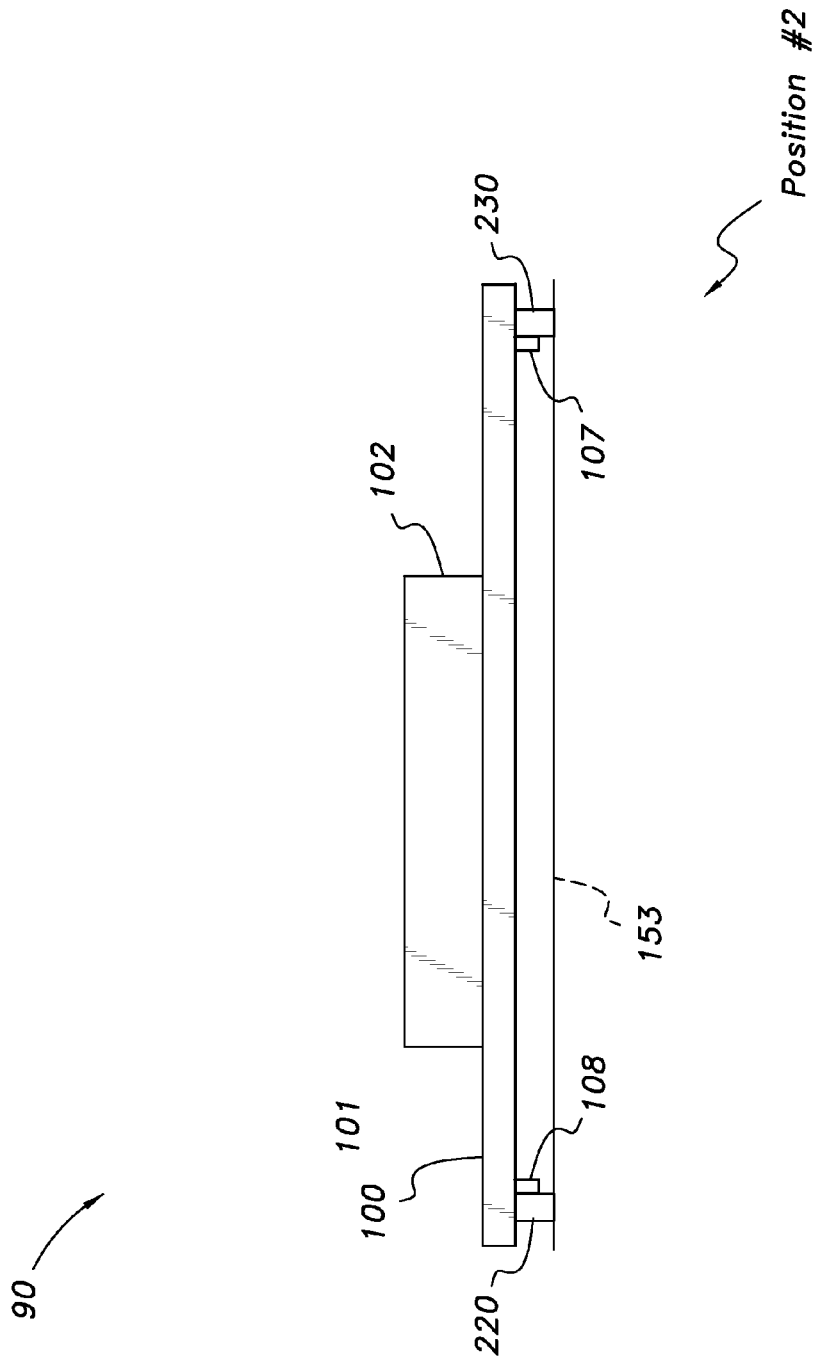

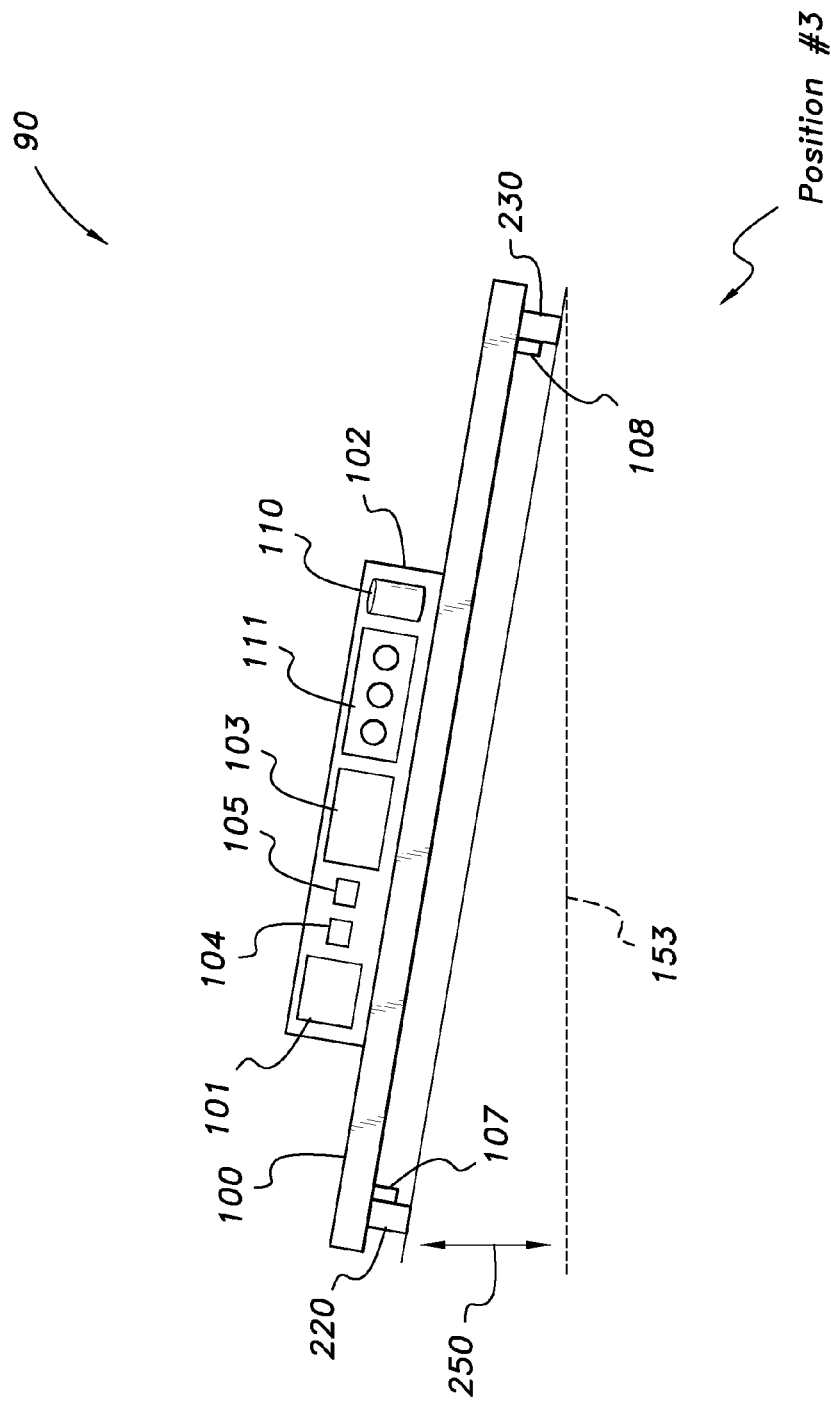

TRAIN RAIL ALIGNMENT AND DISTANCE SYSTEM

CROSS-REFERENCE TO RELATED APPLICATIONS

This application is a Continuation of U.S. patent application Ser. No. 12/575,678 filed on Oct. 8, 2009 now U.S. Pat. No. 7,900,368. This application claims the benefit of priority of U.S. patent application Ser. No. 12/575,678 under 35 U.S.C. §120, and also claims the benefit of priority from U.S. Provisional Patent Application Ser. No. 61/104,726 (filed Oct. 11, 2008). The entire content of patent application Ser. Nos. 61/104,726 and 12/575,678 are incorporated herein by reference in their entirety.

STATEMENT REGARDING FEDERALLY SPONSORED RESEARCH OR DEVELOPMENT

Not Applicable.

FIELD OF THE INVENTION

This invention relates to generally to tools for use in the construction of new rail transport systems and the maintenance and monitoring of existing rail track systems.

BACKGROUND OF THE INVENTION

The rise of globalization, commerce and population centers have led to an increasing demand for efficient and safe rail-based transportation mechanisms. As a result, there is a need for a new generation of tools for use in the construction of new rail systems and the maintenance and monitoring of existing rail systems.

SUMMARY OF THE INVENTION

A train rail alignment and distance system. The train rail alignment and distance system is a durable, highly accurate, portable electronic measurement system that is used for determining both rail inclination and distance between substantially parallel train rail sections during the processes of railway construction, maintenance, and monitoring. The system is designed to work accurately across a wide temperature range and in extreme weather conditions. It is designed to be easily manufactured, configured and maintained. The system also includes several optional integrated features and functions such as: field calibration, factory configuration, GPS and/or USB (universal serial bus) integration, PC and/or Internet-based communications, and data logging, data storage, and data analysis capabilities.

DETAILED DESCRIPTION OF THE INVENTION

This invention is directed to tools for use in the construction of new rail transport systems and the maintenance and monitoring of existing rail track systems. More specifically, the invention is a train rail alignment and distance tool. The train rail alignment and distance tool of the invention is denoted generally by the numeric label "90" and generally referred to as "tool 90". The terms "train rail alignment distance tool 90", "tool of the present invention", "system 90", "tool 90", "present invention" and "present invention 90" are hereinafter regarded as equivalent terms. The terms "distance sensing arrangement" and "distance sensing apparatus" are hereinafter regarded as equivalent terms.

The train rail alignment and distance tool 90 of the present invention is designed for railway construction, maintenance, and monitoring. The tool 90 may be used on dual-rail or multi-rail system where two or more rails are mounted in parallel or substantially parallel format. This includes regional and rapid transit rail, intermodal and cargo rail, light rail, and high-speed rail. Various embodiments and features in the tool 90 may also be used in single-rail systems such as monorail or maglev configurations.

Inclination Sensing

Figure 1:
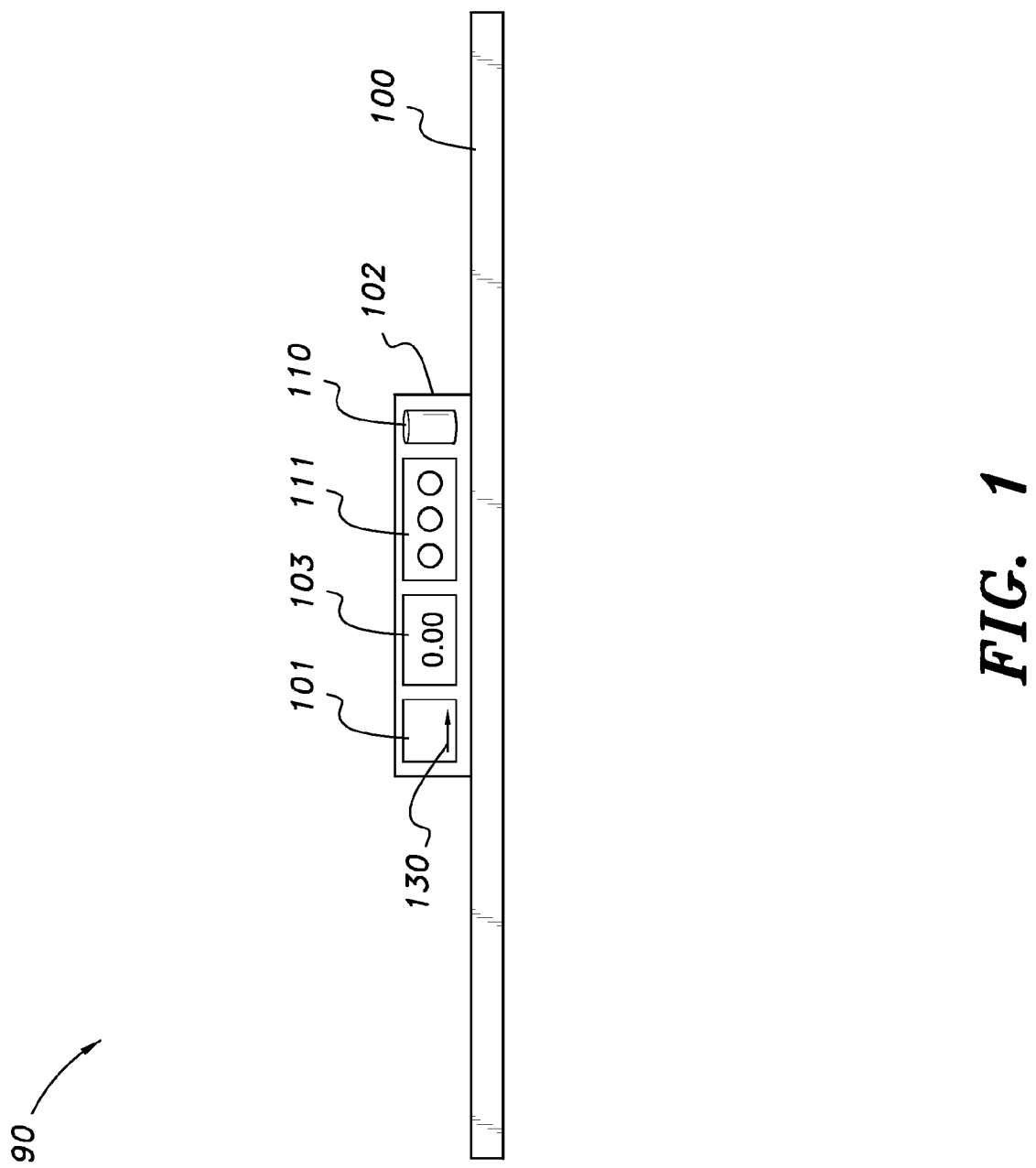
FIGS. 1 through 5 show side planar views of one aspect of the present invention (housing for circuit board is excluded in order to reveal circuit board elements).

In a first embodiment (FIG. 1), the distance tool 90 comprises a body 100, an inclinometer 101, and an output device 103. The body 100 is typically an elongated body having a longitudinal axis 125 (see, e.g., FIG. 6E); the body 100 defines first and second opposite ends 127 and 129, respectively. Tool 90 elements are mounted in or about the body 100. For example, the inclinometer 101 is mounted either in or on the body 100 to allow the inclinometer 101 to sense the inclination of the body 100 along its longitudinal axis with respect to the horizontal plane of gravity 153 as, for example, depicted in FIG. 2; the term "horizontal plane of gravity 153" refers to the plane perpendicular and horizontal to the direction of gravity G (see FIG. 2). The horizontal plane of gravity 153 is normal to the direction of gravity G and is used as the reference horizontal plane in the present invention 90 to calculate, for example, angle of inclination 156 between first and second train rails 150 and 151 (see FIG. 2). It should be understood that the terms "first and second train rails", "first and second rails", and "first and second rail sections" are regarded as equivalent terms.

Figure 24:
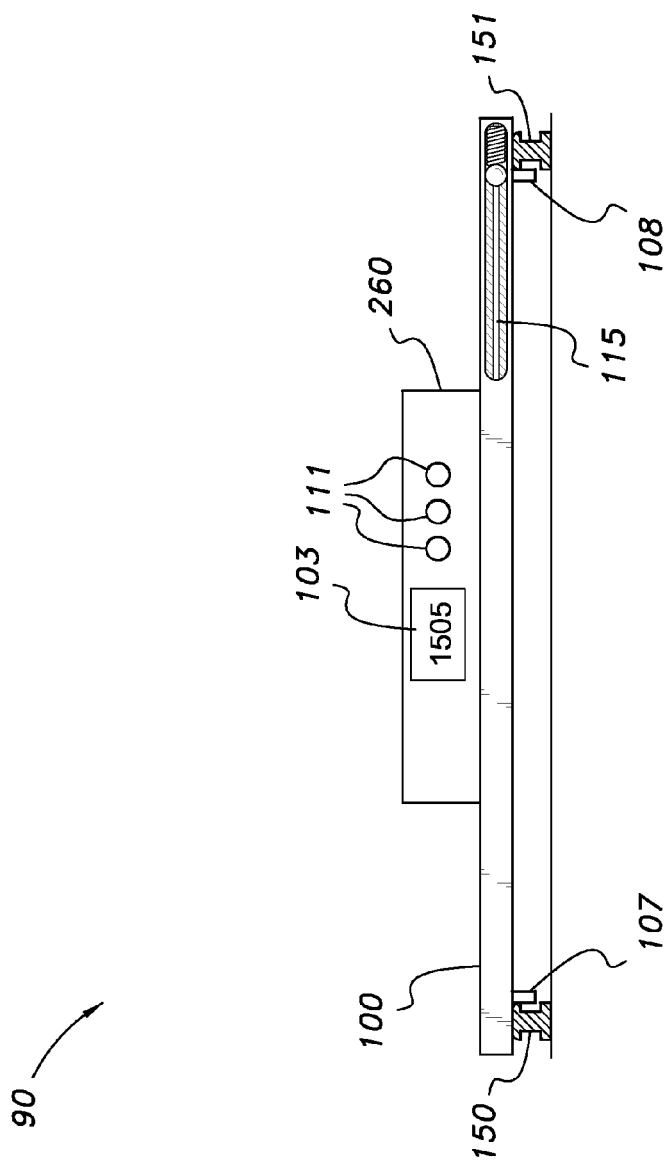
FIG. 24 shows a side view of one aspect of the present invention.

The inclinometer 101 and output device 103 may be separate units connected electronically inside the body 100 or operatively located in a housing 260 attached to the body 100 (see, e.g., FIG. 24). For example, the inclinometer sensor 101 and output device 103 may be discrete parts mounted on a circuit board 102; a version of the circuit board 102 is shown in schematic form in FIG. 1. If used, the circuit board 102 can be a single sided circuit board. The circuit board 102 is preferably a double sided circuit board with at least one component (e.g., at least one of items 101, 103, 104, 105, 106) mounted on each side.

Figure 9:
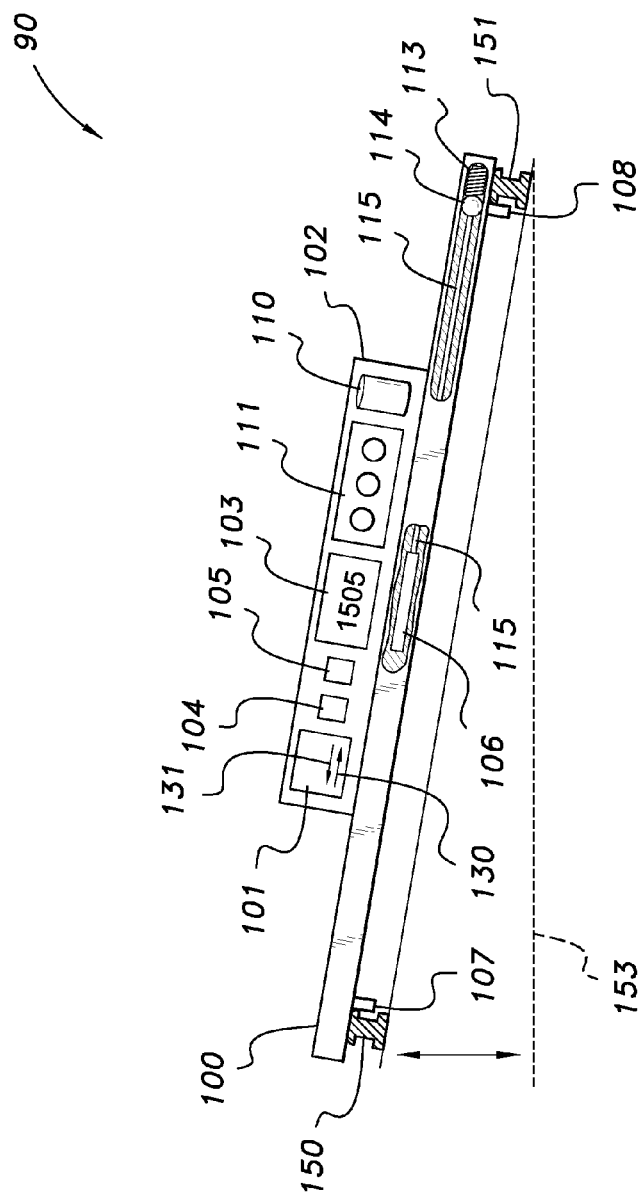
FIGS. 9 and 10 show environmental views in which the present invention is used to measure both distance and inclination with respect to two rail sections.
Figure 26:
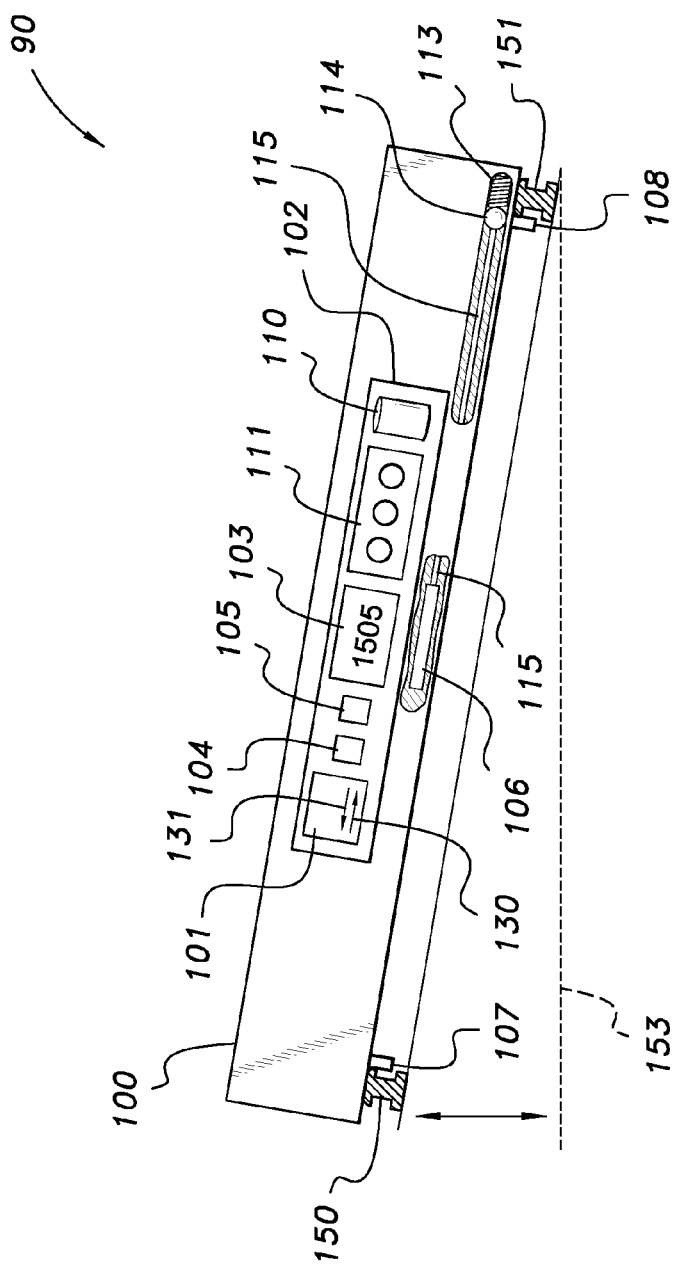
FIG. 26 shows one aspect of the invention in which electronic components are located inside the body section of the invention.

Other components can be mounted on the circuit board 102 as shown, for example, in FIG. 9. For example, the following components can be mounted on the circuit board 102: output device 103, microcontroller 104, memory device 105, power source 110, and input device 111. Alternatively, all the components shown mounted on circuit board 102 as shown in FIG. 9 can be separate units located in the body 100 (see FIG. 26) or in a housing 260 attached to the body 100 (see, e.g., FIG. 24). The terms "microcontroller", "processor", and "CPU" are regarded herein as equivalent terms. It should be understood that the term "CPU" is an abbreviation for "Central Processing Unit".

Inclination output from the inclinometer sensor 101 is typically displayed on output device 103 in any suitable format including, but not limited to, an angle with respect to the horizontal plane of gravity 153, a height difference between rails, inclination difference between rails, a visual indicator displayed on the output device 103 indicating that the rails are both level, or some other format that can be used to determine vertical positional differences between rails.

Figure 2:
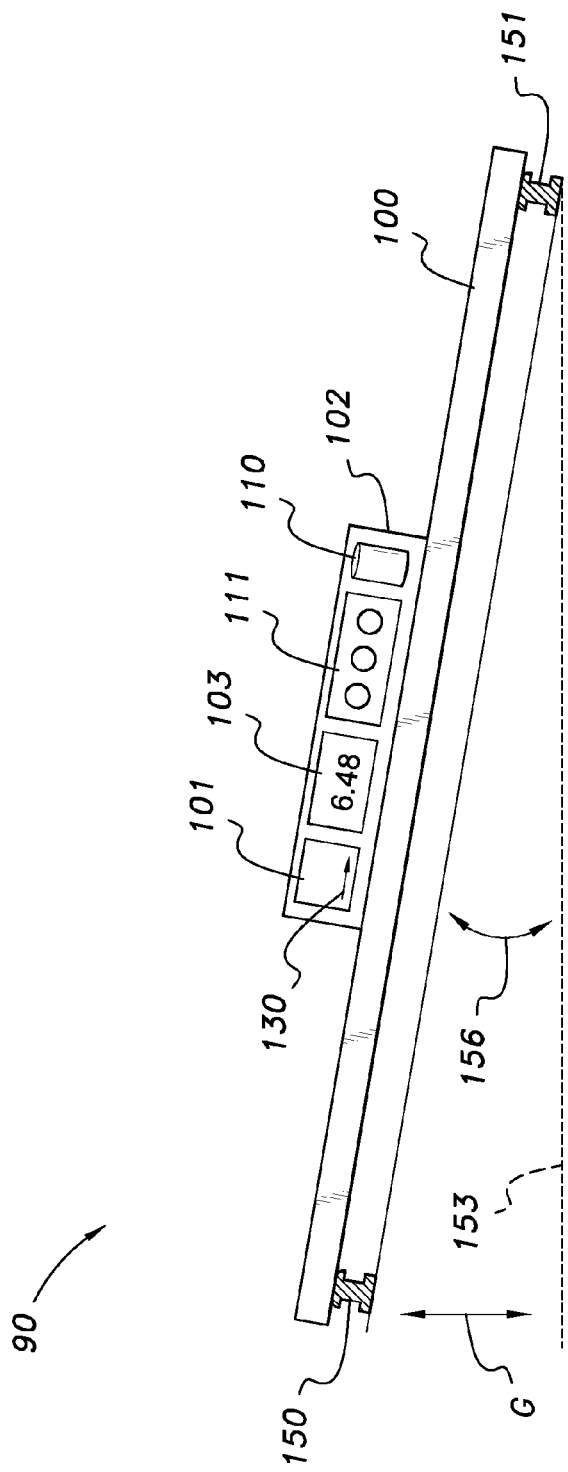

The tool 90 may be used to measure the inclination across two rails in a dual-rail track system as depicted, for example, in FIG. 2. This is accomplished by positioning the tool 90 across two rails (in FIG. 2 shown as first and second rails 150 and 151) so that the body 100 is in contact with both rails at a perpendicular angle with respect to both rails. In this embodiment, the inclinometer 101 has an inclination-sensing axis that can determine the inclination between the first rail 150 in the dual-rail track system and the second rail 151 in the dual-rail track system with respect to the horizontal plane of gravity 153. The inclinometer 101 provides output to the output device 103 about the inclination between the two rails and thus the roll angle of a train traveling on the tracks with regards its longitudinal axis.

In one embodiment, the tool 90 has either the inclinometer 101 or the distance sensor apparatus 106 but not both in order to lower the cost of manufacture and/or purchase price of tool 90.

Figure 10:
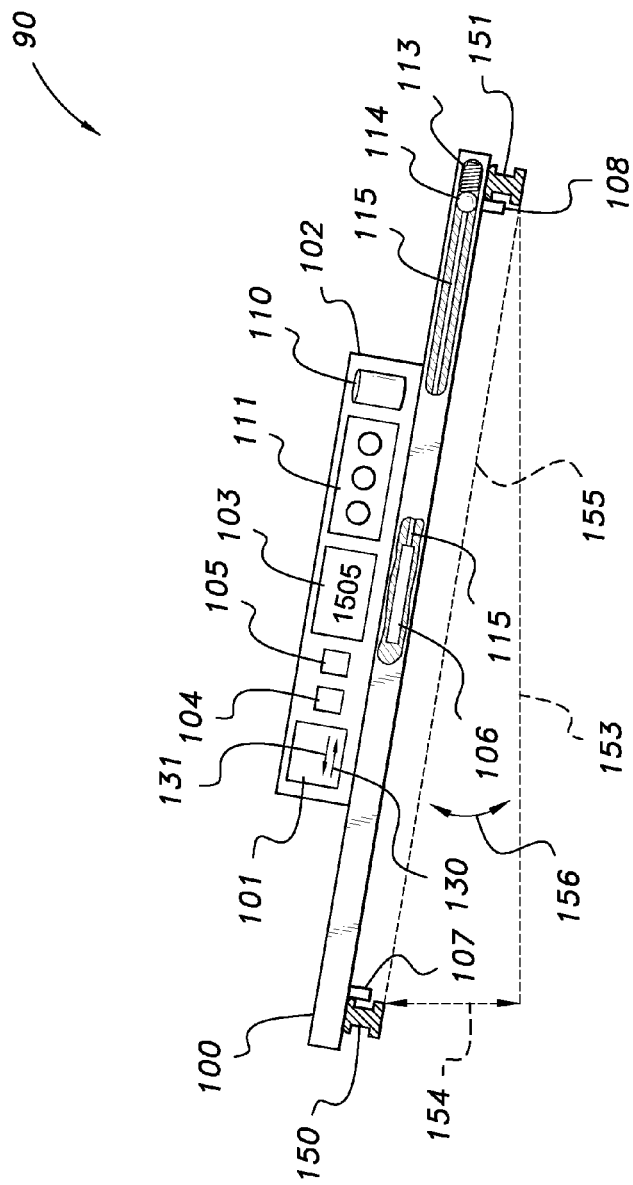

The output device 103 can take any suitable form such as, but not limited to, an LED (light-emitting diode) or LCD (liquid crystal display) screen for displaying output data such as, but not limited to, angle of inclination and/or height data between the rails. The output device 103 can also be in the form of an audible alarm and/or flashing LED if distance between two rails is incorrect. For example, if the output device 103 is in the form of an LCD display, the output format can be a numeric display indicating the value of an angle 156 between rails or a height between rails. As depicted in FIG. 10, a height between rails 150 and 151 can be determined via a standard right-angle calculation if the length of the hypotenuse 155 between rails 150 and 151 and angle 156 are known using the formula: HEIGHT=HYPOTENUSE*SIN (ANGLE). The ability to calculate the height of a one rail with respect to its opposing rail is important in railway construction and maintenance operations. With respect to FIG. 10, the hypotenuse is the distance 155 between two rails as measured using the tool 90. The tool 90 can be set to report a warning signal if two adjacent rail sections are outside a predetermined standard height distance and/or a predetermined inclination value between the rails. For example, if the tool 90 detects a height difference and/or inclination outside a predetermined tolerance a warning is outputted via output device 103 (e.g., a flashing red light and/or an audible alarm).

Figure 3:
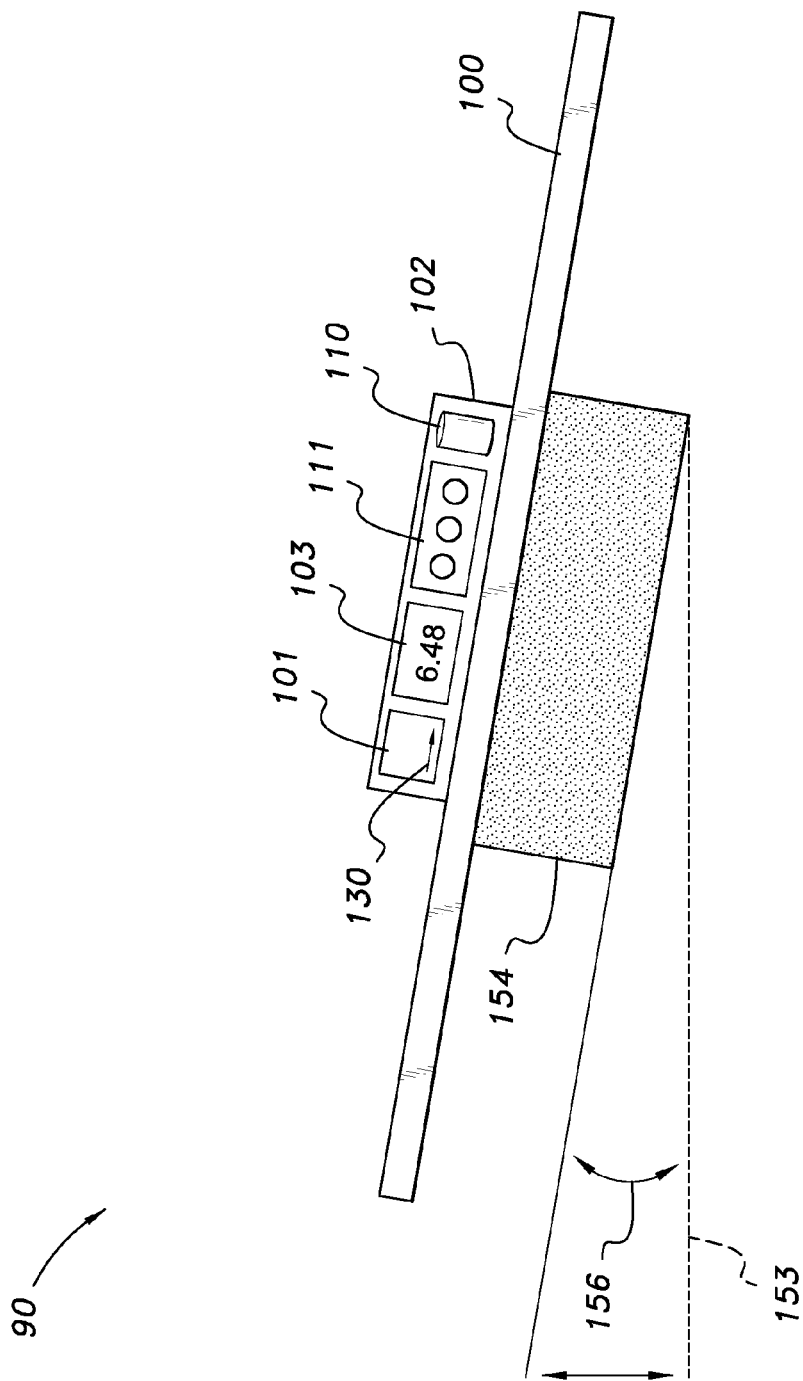

Referring to FIG. 3, the tool 90 can be used to measure the inclination of a single rail in a single-rail system such as a monorail or maglev configuration. This is accomplished by positioning the tool 90 across the single rail 154 so that the body 100 is in contact with the rail but perpendicular to it. In this embodiment, the inclinometer 101 provides output to the output device 103 about the inclination of the single rail and thus the roll angle of a train traveling on the track with regard to its longitudinal axis.

Figure 4:
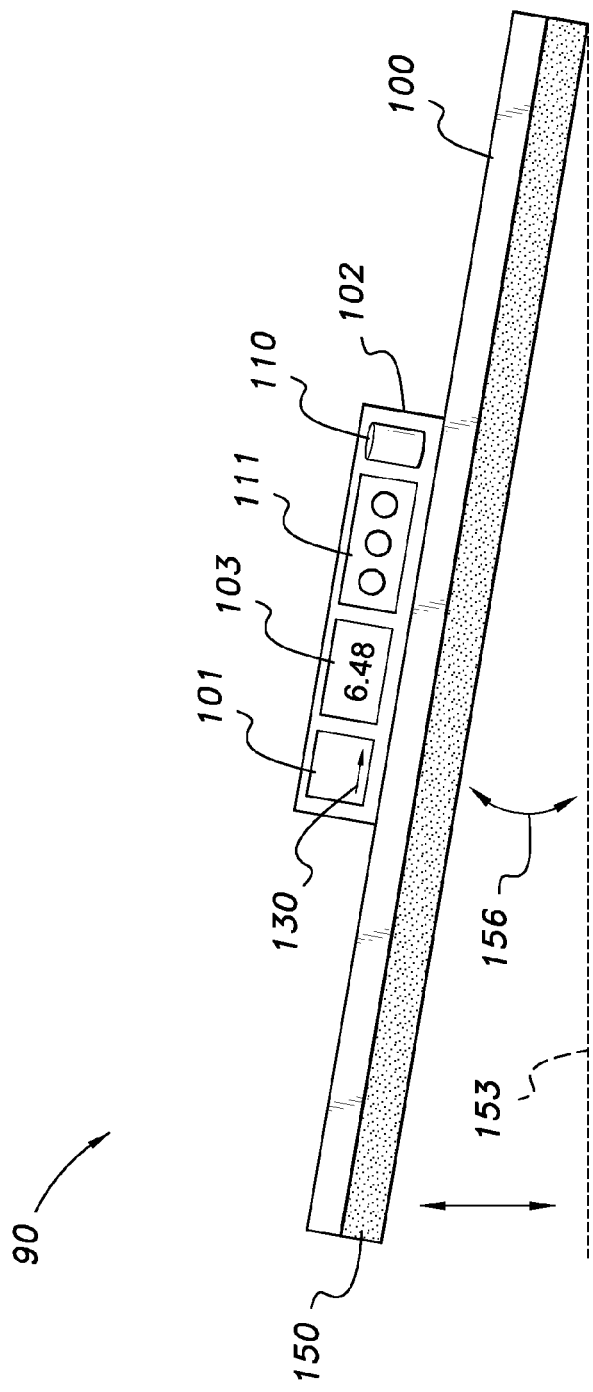

Referring to FIG. 4, the tool 90 can be used to measure the inclination of a single rail 150 along its longitudinal axis, i.e., with regards to its traversal over the ground. This is accomplished by positioning the tool 90 parallel to and along a single rail so that the entire body 100 or some portion of it is in contact with the rail. In this embodiment, the inclinometer 101 provides output to the output device 103 about the inclination of the single rail 150 with respect to the horizontal plane of gravity 153, and thus the pitch angle of a train traveling on the track with regards its lateral axis. This embodiment can be used on single-rail, dual-rail, or multi-rail systems.

Distance Sensing

In another embodiment (FIG. 5), the tool 90 comprises a body 100, a distance sensing apparatus 106, and an output device 103. All tool 90 elements are mounted in or about the body (100) with the distance sensing apparatus 106 positioned in or on the body so that it can sense the distance between two or more rails.

The tool 90 may sense distance through any suitable type of distance sensing apparatus 106 such as, but not limited to: mechanical and electronic distance sensing apparatus, as well as contact and non-contact distance sensing arrangements. A contact distance system is typically a system that physically contacts the two rails to determine distance, whereas a non-contact distance system uses a contactless source to determine the distance between rails.

In one embodiment, the distance sensing apparatus 106 and output device 103 are separate units that connected electronically. In another embodiment, the distance sensing apparatus 106 and output device 103 are discrete parts of a circuit board 102. The circuit board 102 may also contain one or more other elements that are part of the tool 90, such as a microcontroller 104 or memory device 105. Distance output is dependent in part on the type of output device 103, but can be provided in any suitable format such as, but not limited to: the display of numbers on a screen indicating actual physical distance between two rails, or simply an indicator, such as a flashing light or audible signal, that the rails are spaced correctly.

In one contact-based embodiment, the tool 90 may be used to measure the distance between two rails in a dual-rail or multi-rail track system. This is accomplished by positioning the tool 90 across two rails so that the body 100 is in contact with both rails but essentially perpendicular to the rails. As demonstrated on the dual-rail system in FIG. 5, the distance sensing apparatus 106 in this embodiment can determine the distance between the first rail 150 and the second rail 151. In this embodiment, the body 100 contains an extendable or collapsible extension 116, or any suitable telescoping arrangement. The distance sensing apparatus 106 detects changes in extendable or collapsible extension 116 and provides information to the output device 103 about the distance between the two rails. This embodiment may also include any suitable mechanism such as, but not limited to, a guide rod 115 that mechanically transfers the movement or position of the extendable or collapsible extension 116 to the distance sensing apparatus 106 (shown in, e.g., FIG. 5).

Figure 5:
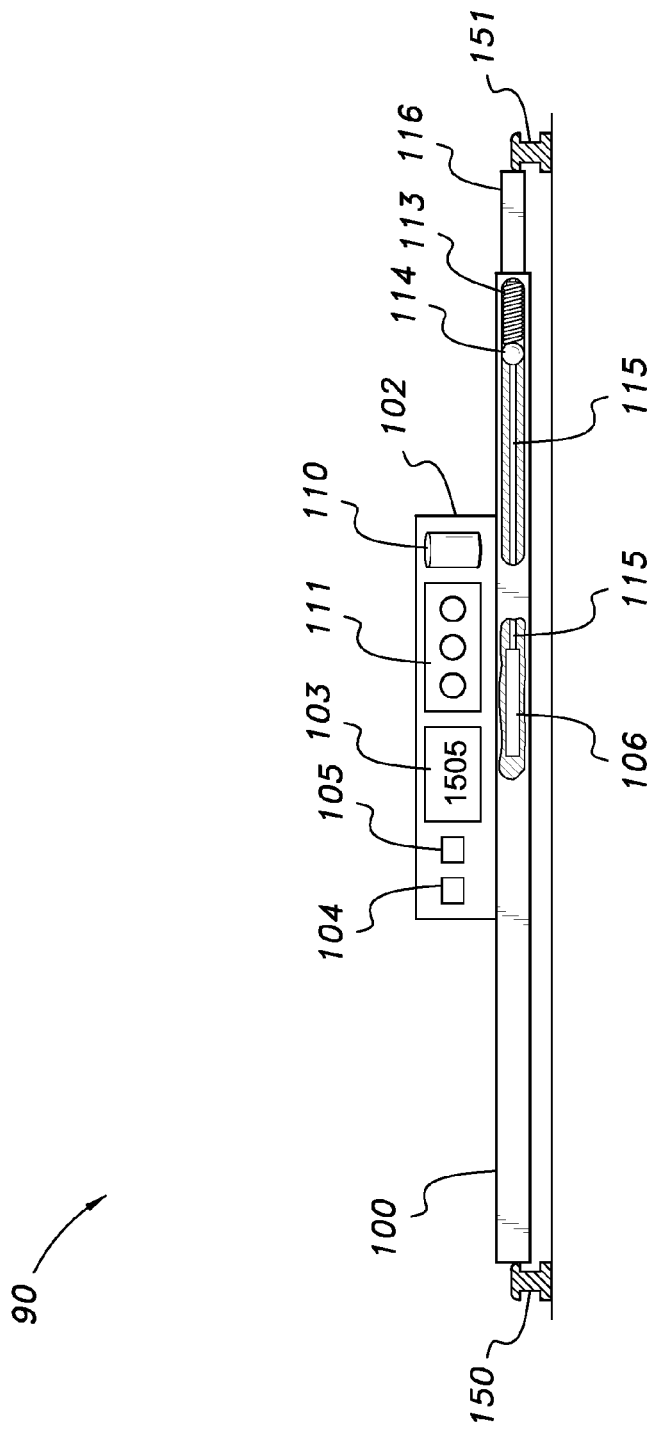

This embodiment may optionally include a tension or compression based mechanism such as a spring 113 attached to the extendable or collapsible extension 116 such that the spring 113 brings the extendable or collapsible extension 116 back to a fully extended starting position when not engaged against a rail. Any suitable type of compression or tension spring can be used. FIG. 5 shows an example of a compression spring 113 that is used to push the extendable or collapsible extension 116 against the rail 151. This embodiment may also include a knob 114 or any suitable substitute for a knob that can be suitably connected to the extendable or collapsible extension 116. The knob 114 is used to manually position the extendable or collapsible extension 116 when performing operations such as contacting the extendable or collapsible extension 116 against a rail to determine the distance between two rails.

In another embodiment (FIG. 6), the system body 100 contains a movable measuring element 108 that can traverse some portion of system body 100 to enable measurements between first and second rail sections 150 and 151. In this embodiment a fixed measuring point 107 and a movable measuring point 108 are attached to the body 100. In typical use the fixed point 107 is positioned to come into contact with the first rail section 150 (in the example shown in FIG. 6 the fixed point 107 is contacted against the inside edge of the first rail 150) and the moveable point 108 adjustably positioned to contact the second rail section 151 (in the example shown in FIG. 6 the moveable point 108 is contacted against the inside edge of the second rail 151). Since the movable measuring point (108) can traverse in the longitudinal direction along some portion of the system body 100 the tool 90 can be adjusted to measure a wide variety of rail configurations. The terms "first rail 150" and "first rail section 150" are regarded as equivalent terms; and the terms "second rail 151" and "second rail section 151" are regarded as equivalent terms.

Figure 6:
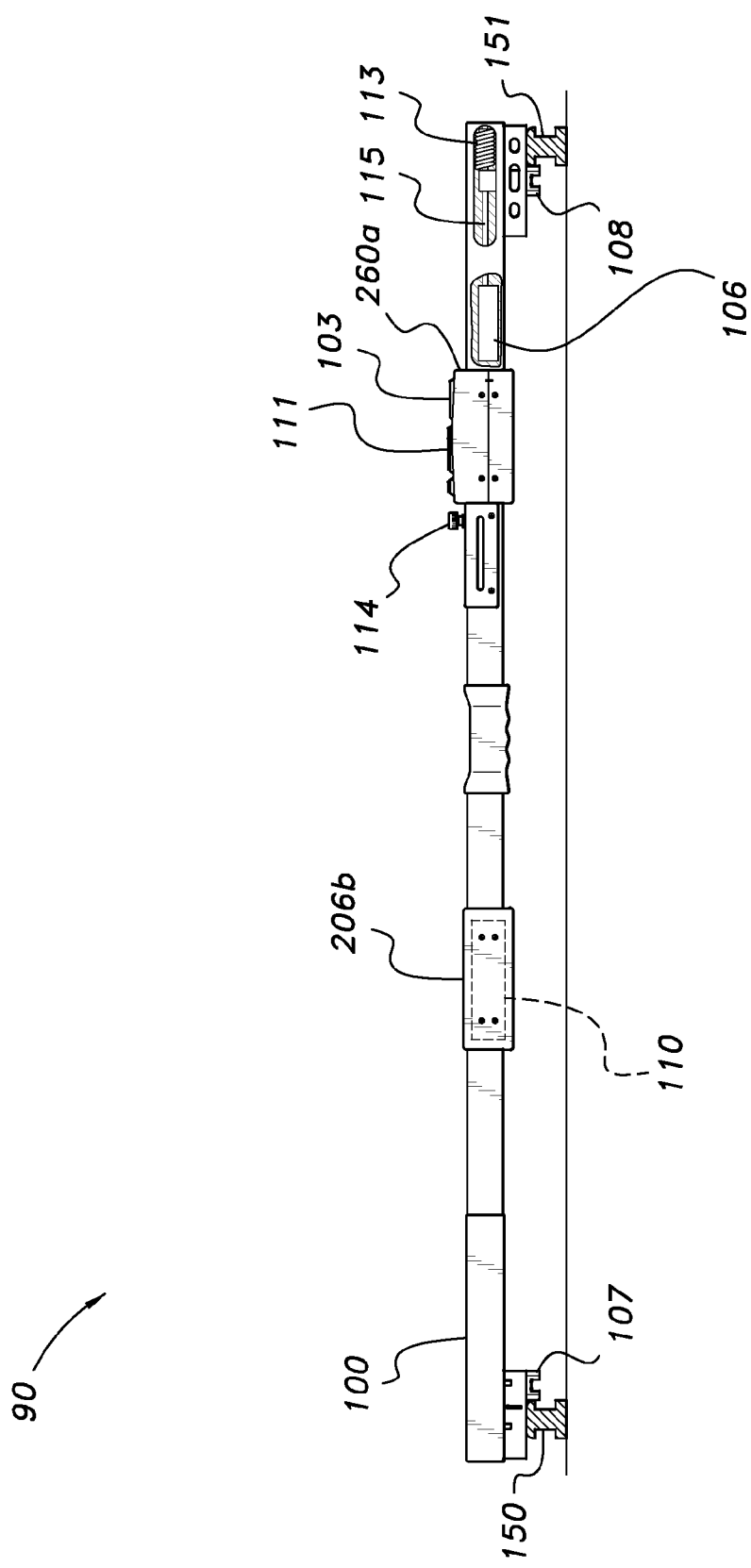
FIGS. 6 through 6E show another aspect of the present invention in 3D perspective view.
Figure 6A:
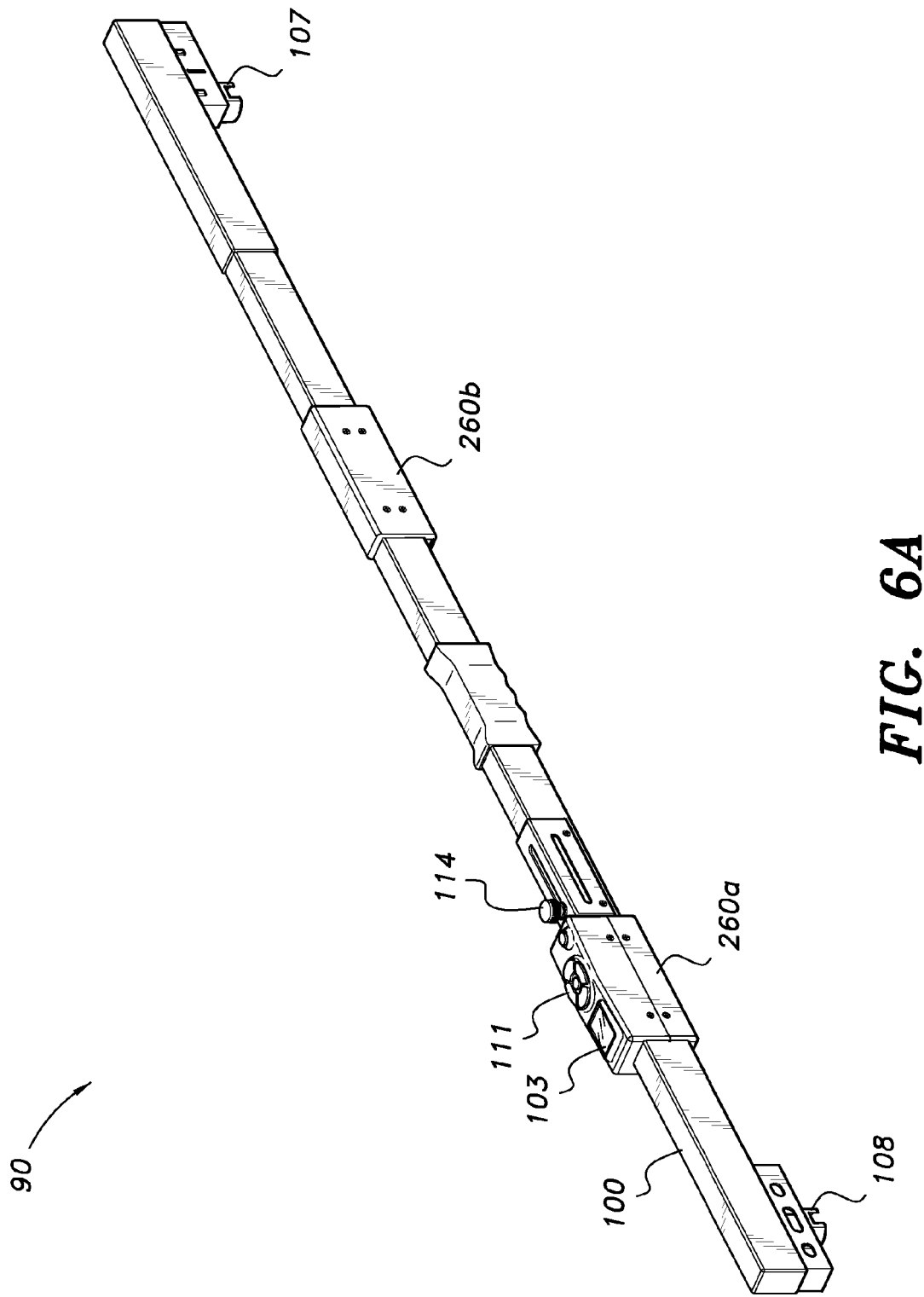
Figure 6B:
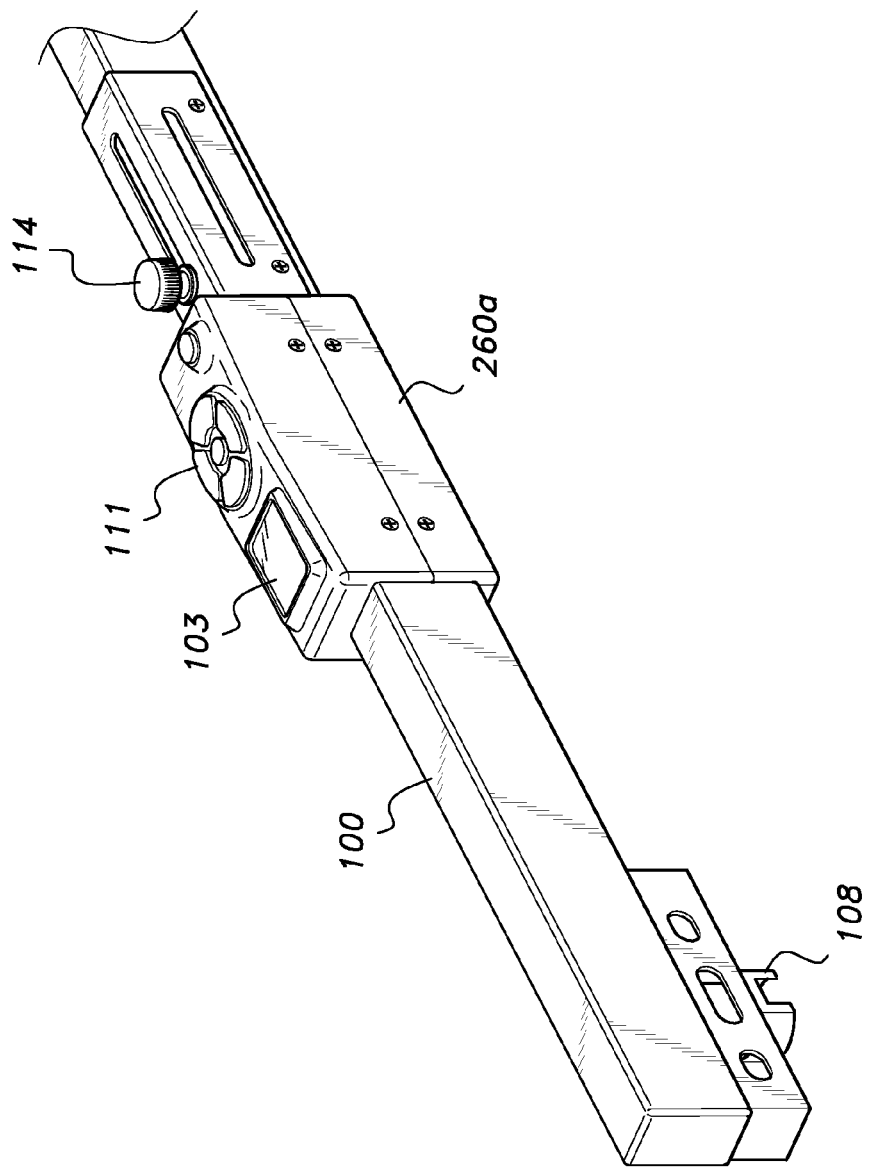
Figure 6C:
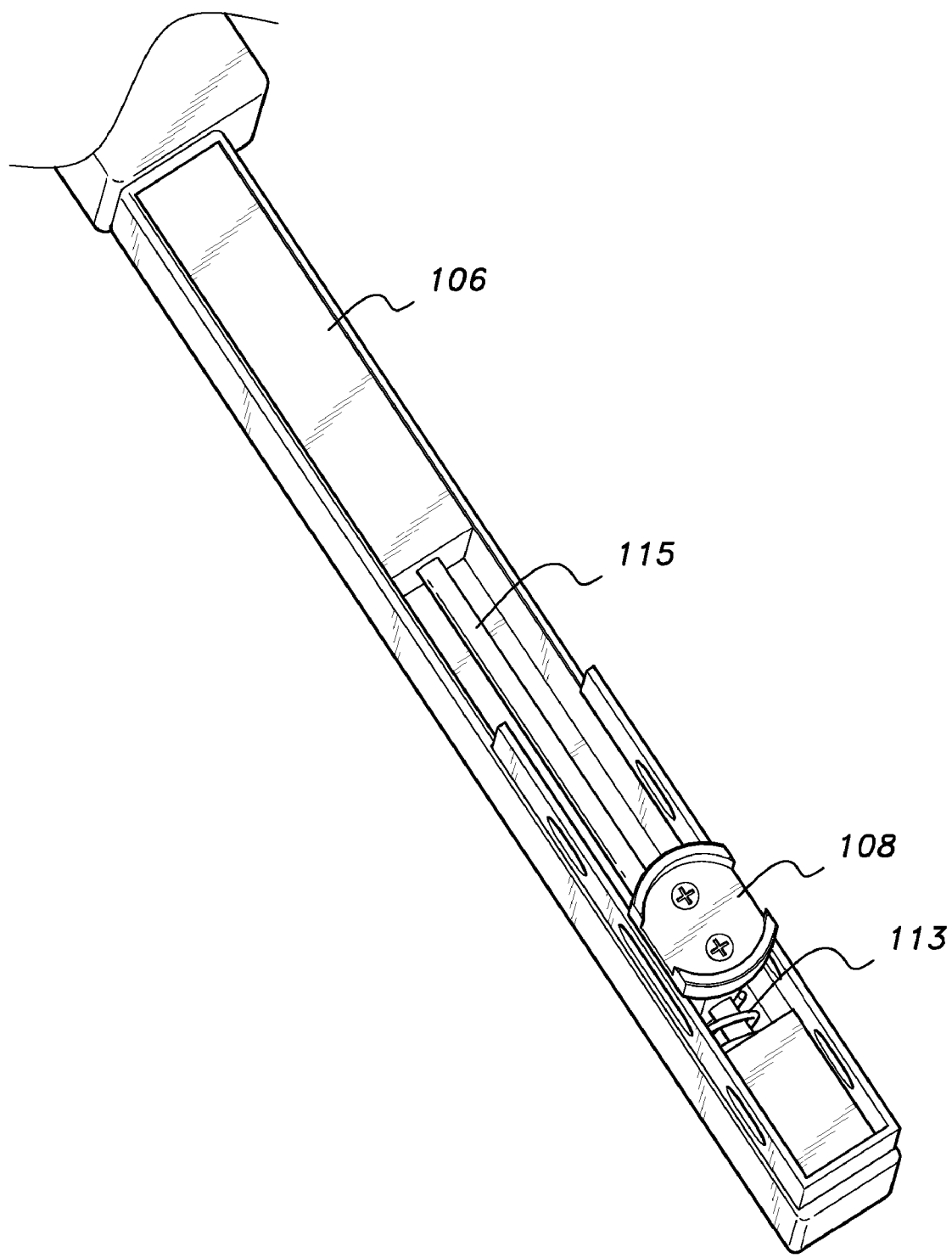
Figure 6D:
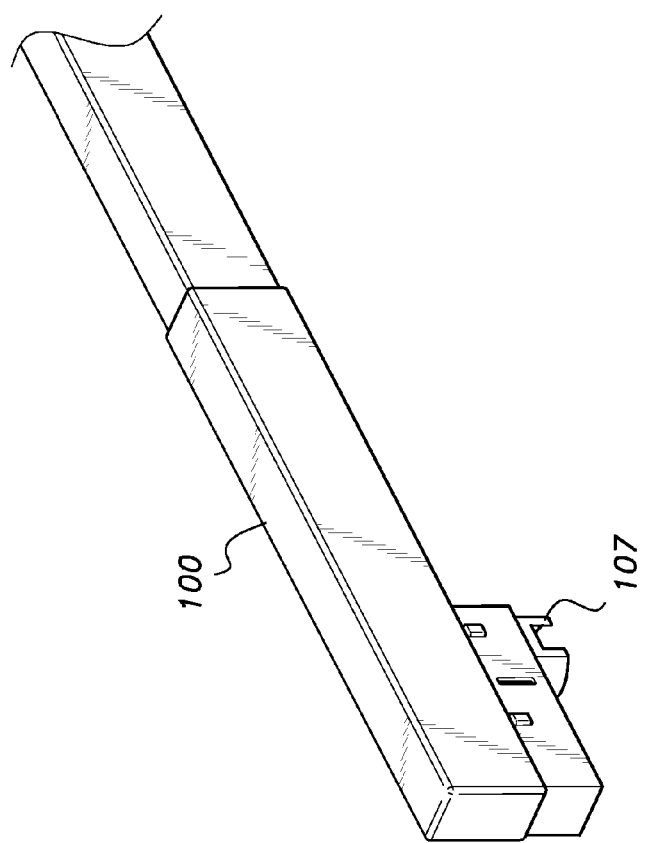
Figure 6E:
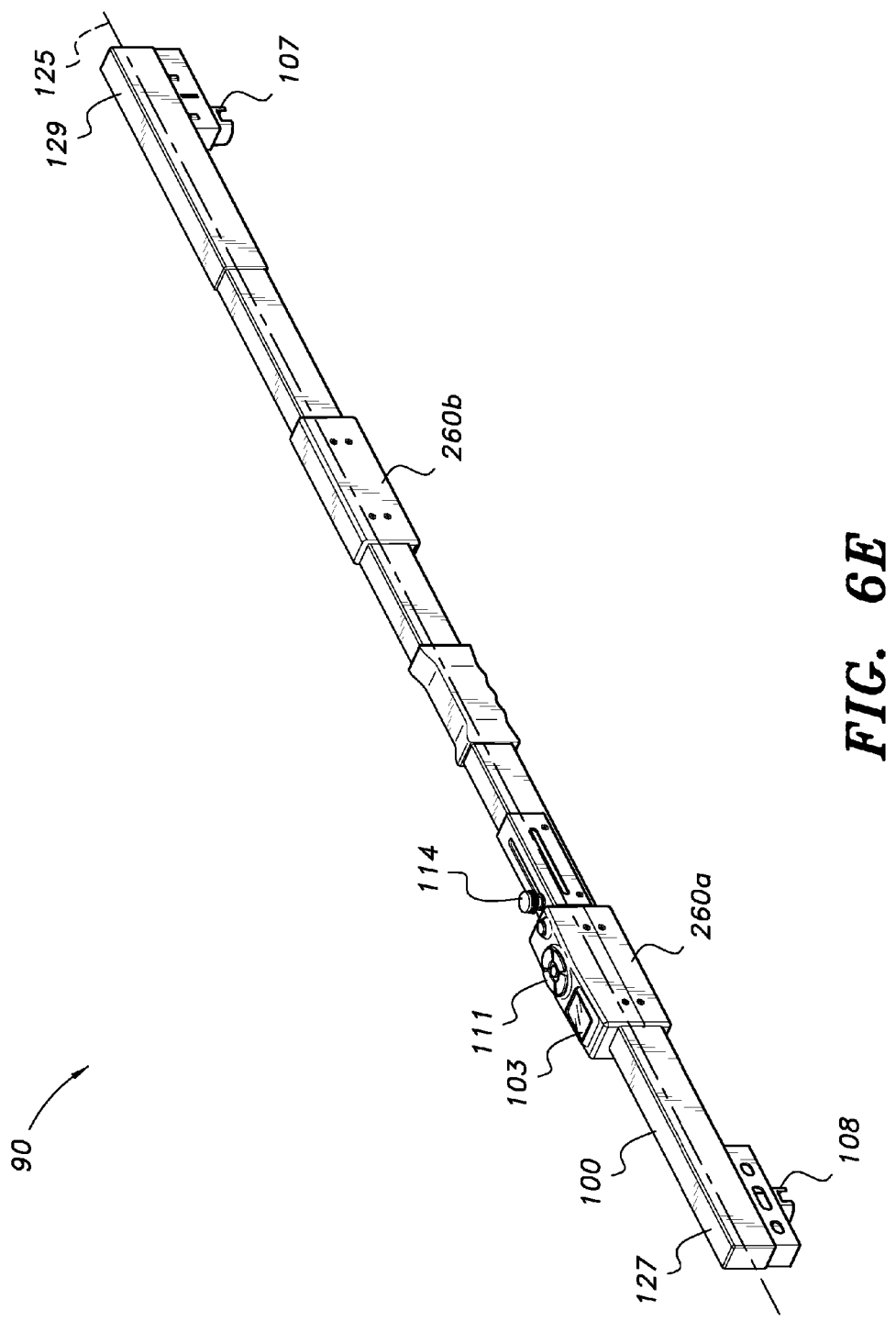

Still referring to FIG. 6, a spring 113 or tension-based mechanism attached to the movable measuring point 108 brings the movable measuring point 108 back into a fully extended starting position when not engaged against a rail. This embodiment may also include a knob 114 or similar part to connect to the movable measuring point 108. The knob 114 can thus be used to manually position the movable measuring point 108 when performing operations such as engaging it against a rail. This embodiment may also include any suitable guiding mechanism such as, but not limited to, a guide rod 115 for purposes of stabilizing and/or guiding the mobile measuring point 108 in its traversal along the system body 100. The tool 90 may also include any suitable mechanism such as, but not limited to, a push rod 119 (see FIG. 7A) that mechanically transfers the movement or position of the movable measuring point 108 to the distance sensing apparatus 106.

In one embodiment, the tool 90 allows for real-time distance measurements to be depicted by the output device 103. Real-time distance measurements are measurements that are immediately reported as the distance sensing apparatus 106 senses changes in distance. This type of measurement is most often used when a system user seeks to take a general measurement of a rail distance.

Figure 11:
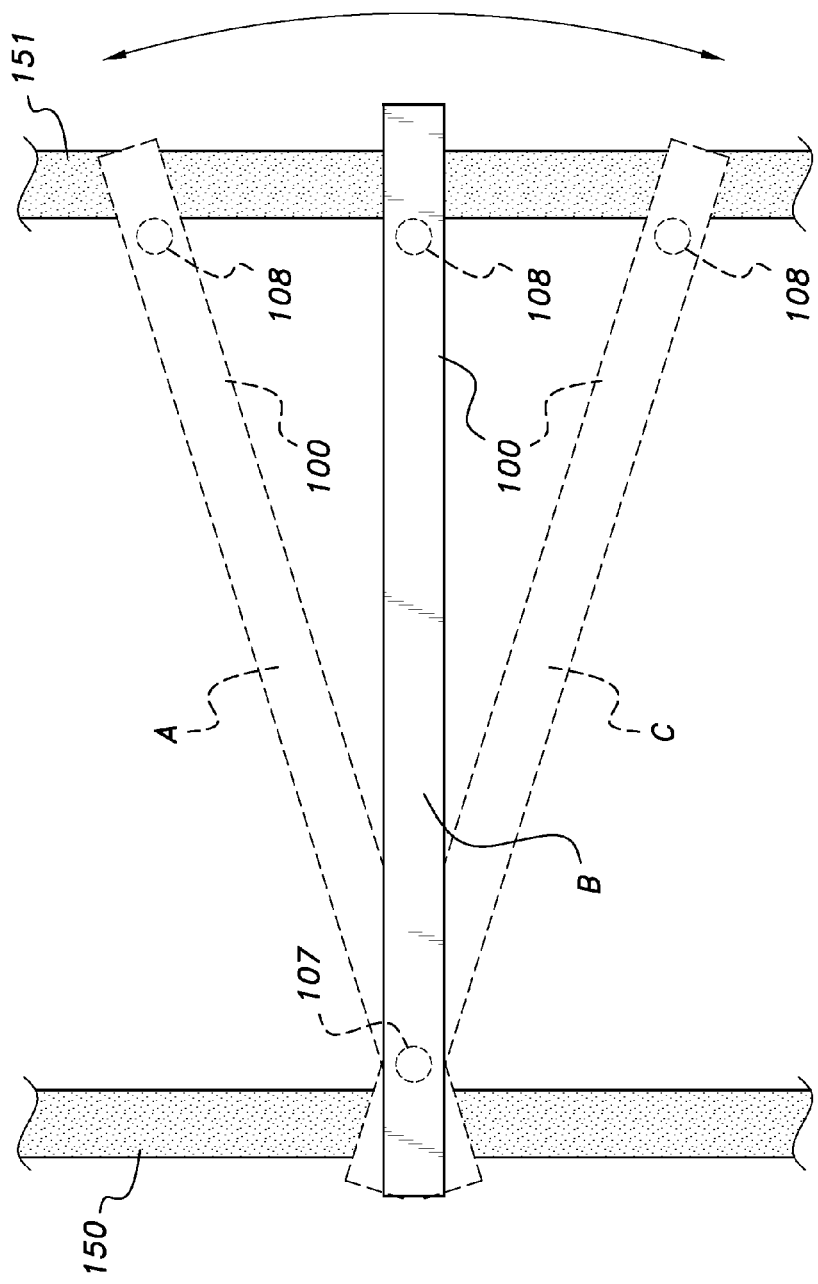
FIG. 11 shows a top environmental view in which one embodiment of the invention is used to determine the distance between two rail sections without having to place the invention at a perpendicular angle with respect to either rail section.

In another embodiment, the tool 90 allows for minimum distance measurements to be depicted by the output device 103. Minimum distance measurements are measurements that are immediately reported as the distance sensing apparatus 106 senses changes in distance that are less than any previously reported distance. This type of measurement is most useful when a system user is adjusting the position of the system body 100 with respect to the rails in an attempt to find the shortest distance and thus the absolute perpendicular position between two rails. As depicted in FIG. 11, this embodiment allows the system user to use a simple technique for finding the minimum distance between rails, and thus the most accurate distance measurement between rails. This technique involves engaging the fixed measuring point 107 on one side of the body 100 against one rail 150, and then sliding the movable measuring point 108 on the other side of the body 100 back and forth against the opposing rail 151 in pattern that is essentially parallel to the opposing rail. As FIG. 11 demonstrates, the sliding motion allows the minimal distance indicated in position B to be quickly found by sliding the body back and forth between the A and C positions. This embodiment helps avoid a rail construction or maintenance worker ("user") making wrong distance measurements in the event the user does not place the body 100 perpendicular with respect to the rails. The same technique demonstrated in this embodiment can be applied to other distance sensing arrangements described herein.

Figure 11A:
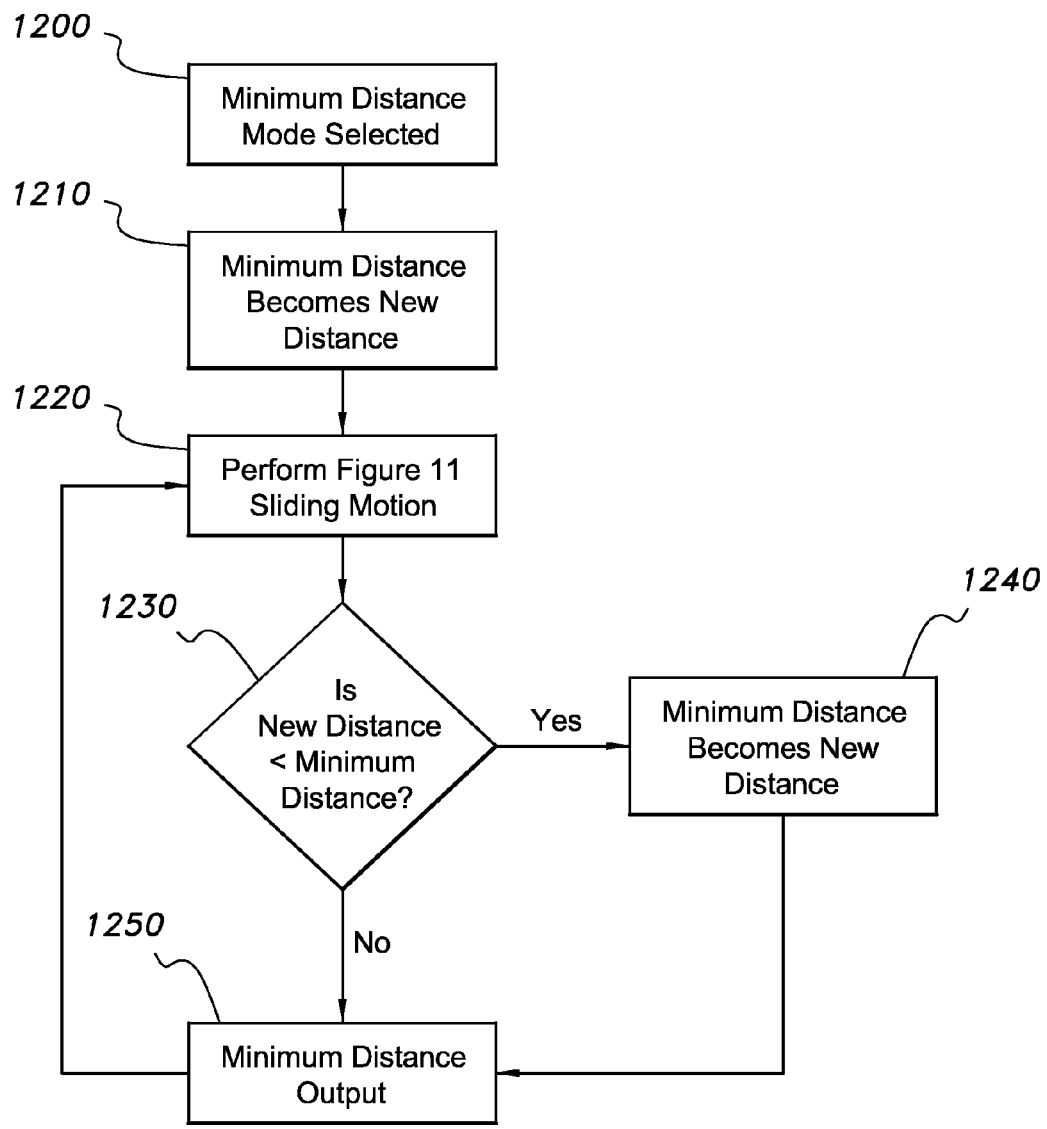
FIG. 11A shows an exemplar logic flowchart of data acquisition with respect to FIG. 11.

The logic to calculate the minimum distance can be coded as an algorithm and stored in computer code on a memory device 105 and/or on the microcontroller 104 thereby providing a computer implemented means for allowing a user to determine the distance between first and second train rails by calculating the distance between a fixed measuring point and a moveable measuring point to generate a plurality of distance measurements, wherein the plurality of distance measurements are analyzed to select the shortest distance measurement, wherein the shortest distance measurement is designated as the actual distance between first and second train rails. The computer implemented means can also be implemented as depicted in FIG. 11A where upon selection by the system user of minimum distance mode at 1200, the most recently calculated distance from the distance sensing apparatus 106 is saved as the minimum distance at 1210. As the system user then performs the sliding motion 1220 as depicted in FIG. 11, the newly calculated distance is compared to the current minimum distance 1230. If the newly calculated distance is less than the current minimum distance, then the newly calculated distance becomes the minimum distance at 1240, otherwise the existing minimum distance remains the same. Upon completion of these steps, the minimum distance is output at 1250 through the output device 103.

Inclination and Distance Sensing

Referring to FIG. 9, the tool 90 comprises a body 100, an output device 103, and both an inclinometer 101 and a distance sensing apparatus 106. All tool 90 elements are mounted in or about the body 100 with the distance sensing apparatus 106 positioned in or on the body so that it can sense the distance between two rails. The inclinometer 101 is positioned either in or on the body so that it can sense the inclination of the body 100 along the longitudinal axis with respect to the horizontal plane of gravity 153.

In one embodiment, the inclinometer 101, distance sensing apparatus 106, and output device 103 may be separate units that are connected electronically. In another embodiment, the inclinometer 101, distance sensing apparatus 106, and output device 103 may be discrete parts of a circuit board 102. In another embodiment, the distance sensing apparatus 106 may be a separate unit connected electronically to a circuit board 102 that contains an inclinometer 101 and an output device 103. The system or circuit board 102 may also contain one or more other elements that are part of the tool 90, such as a microcontroller 104 or memory device 105.

In one embodiment that contains an inclinometer 101 and distance sensing apparatus 106, the tool 90 can perform inclination measurements across two or more rails, as well as concurrently performing distance measurements across multiple rails. Furthermore, the inclination and distance sensing capabilities can be used in combination to produce compound data output.

Examples of such compound data output include, but are not limited to, a height difference between rails based on the distance between rails (FIG. 10), a height distance between the rails based on a rail distance standard, or simply an indicator that the rails are both level and spaced correctly. The tool 90 can be set to report if two adjacent rail sections (e.g., first and second rails 150 and 151) are outside a predetermined rail distance standard and output a signal to the output device 103. If the rail sections are designated to be, for example, 1505 mm apart and a predetermined tolerance is set to, for example, +/−0.2%, then if the tool 90 detects that adjacent rail sections are outside this predetermined tolerance (e.g., 3.2 mm apart), a warning is outputted via output device 103 (e.g., a flashing red light and/or an audible alarm). The inclinometer 101 can be used in combination with the predetermined standard rail distance to enable the calculation of the height difference between first and second rail sections and the height difference displayed on the output device 103, which can be a digital output device.

Inclinometer

The inclinometer (101) may be any suitable type of inclination system such as, but not limited to: standard inclinometers or accelerometers. For example, in one embodiment (FIG. 2), the inclinometer (101) is a single axis accelerometer whose sensing element 130 is oriented along the longitudinal axis of the body 100 with respect to the horizontal plane of gravity 153.

Figure 12:
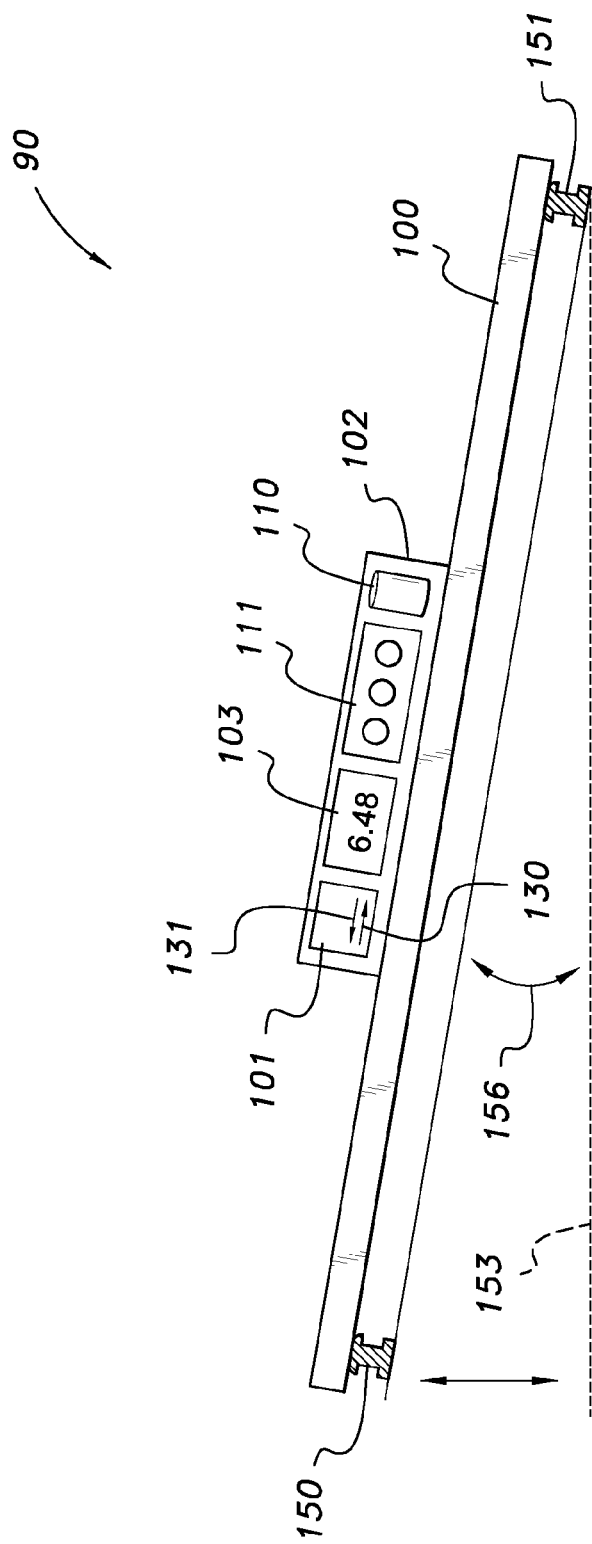
FIG. 12 shows the invention being used to determine angle of inclination between two rail sections using a dual-axis accelerometer whose sensing elements are mutually opposite in direction.

In another embodiment (FIG. 12), the inclinometer 101 is comprised of two single axis accelerometers (or one dual-axis accelerometer) whose sensing elements 130 and 131 are mutually opposite in direction but are nevertheless oriented along the longitudinal axis of the body 100 with respect to the horizontal plane of gravity 153. This embodiment provides a greater amount of accuracy as the output from the two accelerometers can be differentiated externally (differential measurement), either by using a differential amplifier or a microcontroller.

Figure 13:
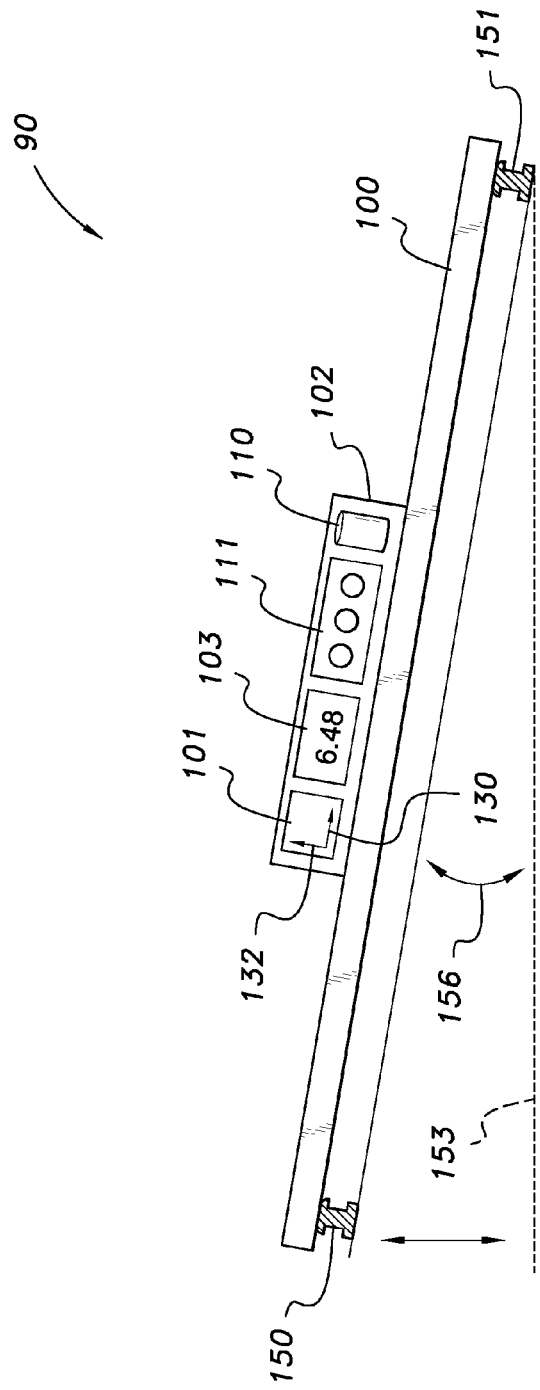
FIG. 13 shows the invention being used to determine angle of inclination between two rail sections using two single axis accelerometers.

In another embodiment (FIG. 13), the inclinometer 101 is comprised of two single axis accelerometers (or a single dual-axis accelerometer). In this embodiment, one sensing axis 130 is oriented along the longitudinal axis of the body 100 with respect to the horizontal plane of gravity 153, and the other sensing axis 132 is perpendicular to the first sensing element. This embodiment allows a full 360 degrees of measurement from the tool 90.

In another embodiment, the inclinometer, accelerometer, or accelerometers contain compensation circuitry and/or software to counter changes in temperature. The compensation circuitry and/or software are designed to counter temperature-based changes in sensitivity or offset. As an example, temperature changes can make an accelerometer more or less sensitive, and can also change the offset (or 0 g position, "zero gravity" position) of the accelerometer.

Temperature compensation may be internally controlled by the inclinometer, accelerometer, or accelerometers, externally controlled by the inclinometer, accelerometer, or accelerometers, or controlled through some combination of internal and external control. Temperature compensation may further be provided through a component such as code in an external microcontroller, circuitry, or some combination of the tool 90 elements.

In one embodiment (FIG. 15), the inclinometer 101 is connected to a microcontroller 104 or other type of Computer Processing Unit (CPU) or electronic component or circuit that provides translation and/or filtering of the signal before providing it to the output device 103. Translation and/or filtering may include, but is not limited to, digital signal processing. It should be understood that the number "1505" (see, FIG. 15) that is displayed inside output device 103 is merely an example output distance measurement (1505 mm, i.e., 1505 millimeters), the output displayed by output device 103 could be in mm or any recognized units. The output device 103 can also output distance data audibly, i.e., output device 103 can optionally include a speaker.

Distance Sensing Arrangement

The distance sensing apparatus 106 may be any suitable type of distance sensing arrangement, distance sensing system, or distance sensor. This includes, but is not limited to, electrical distance sensing arrangements, combined mechanical and electronic distance sensing arrangements, as well as contact and non-contact distance sensing arrangements.

Figure 7:
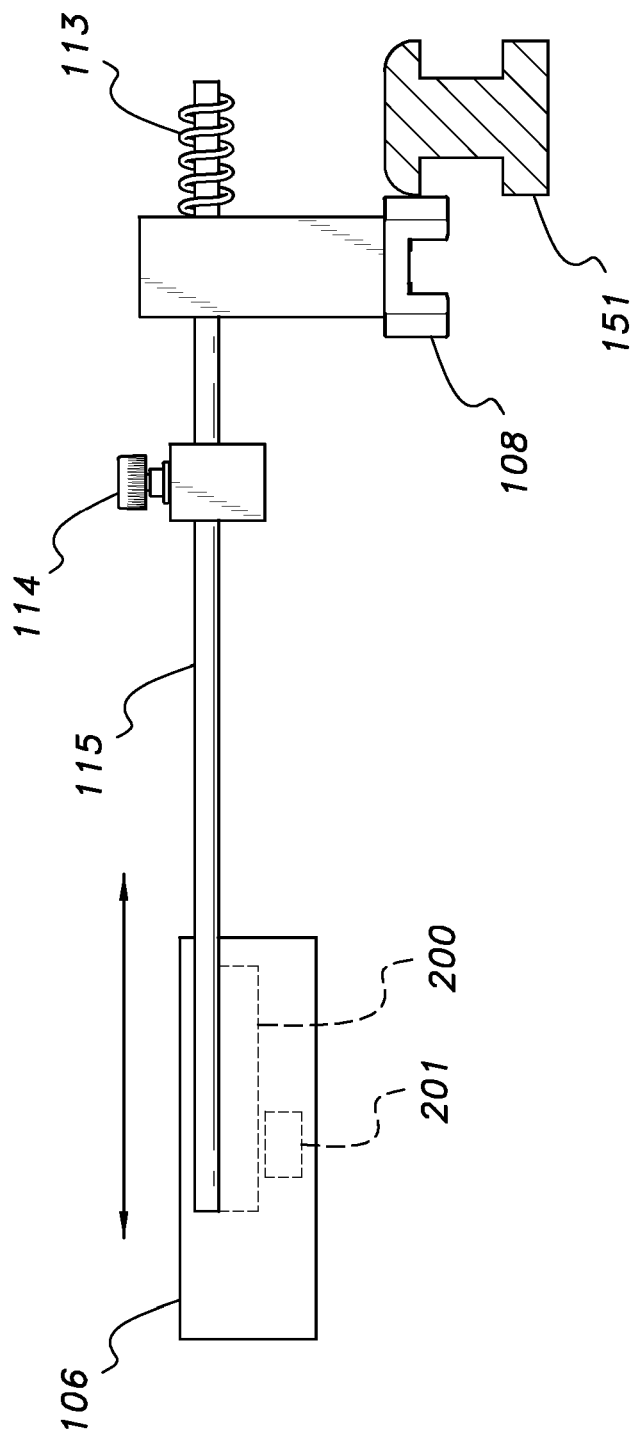
FIG. 7 shows the apparatus involved in determining the position of a movable measuring point according to the invention.
Figure 7A:
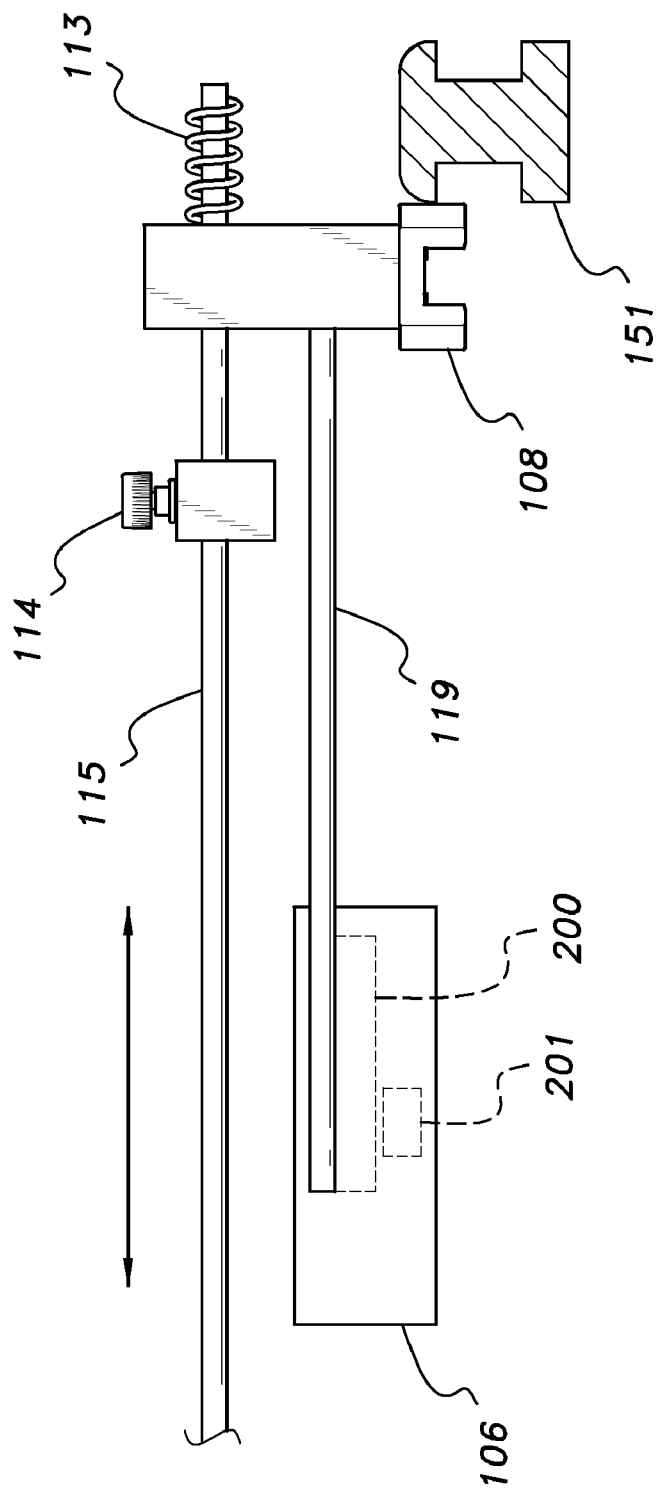
FIG. 7A shows the apparatus involved, which in this embodiment includes a push rod, in determining the position of a movable measuring point according to the invention.

In one contact-based distance sensing embodiment, the distance sensing element is an electronic linear encoder. Linear encoders come in many forms, including but not limited to magnetic linear encoders, electro-mechanical linear encoders, and optical linear encoders. Such a distance sensing system is typically comprised of two parts (a pattern or material based part and a sensor part) that traverse in a linear fashion across each other, over each other, or in some motion relative to each other. In most common linear encoder systems, the sensor detects changes in distance based on the traversal of the pattern or material over or near the encoder's sensor. As depicted in FIG. 7, the tool 90 may use a magnetic linear encoder distance sensing system that includes a magnetic strip 200 with repeating poles at fixed distances and magnetic linear encoder sensor 201.

In one configuration, the magnetic strip 200 and magnetic linear encoder sensor 201 are mounted to the system body 100 in such a way that the traversal of the movable measuring point (108) concurrently moves the magnetic linear encoder sensor 201 over the magnetic strip 200. This movement results in incremental signals that can be translated into a physical distance between the fixed measuring point 107 and the movable measuring point 108 and thus a distance between two rails. In another similar configuration, the magnetic strip 200 and magnetic linear encoder sensor 201 are mounted to the system body 100 in such a way that the traversal of the movable measuring point 108 concurrently moves the magnetic strip 200 over the magnetic linear encoder sensor 201.

Figure 8:
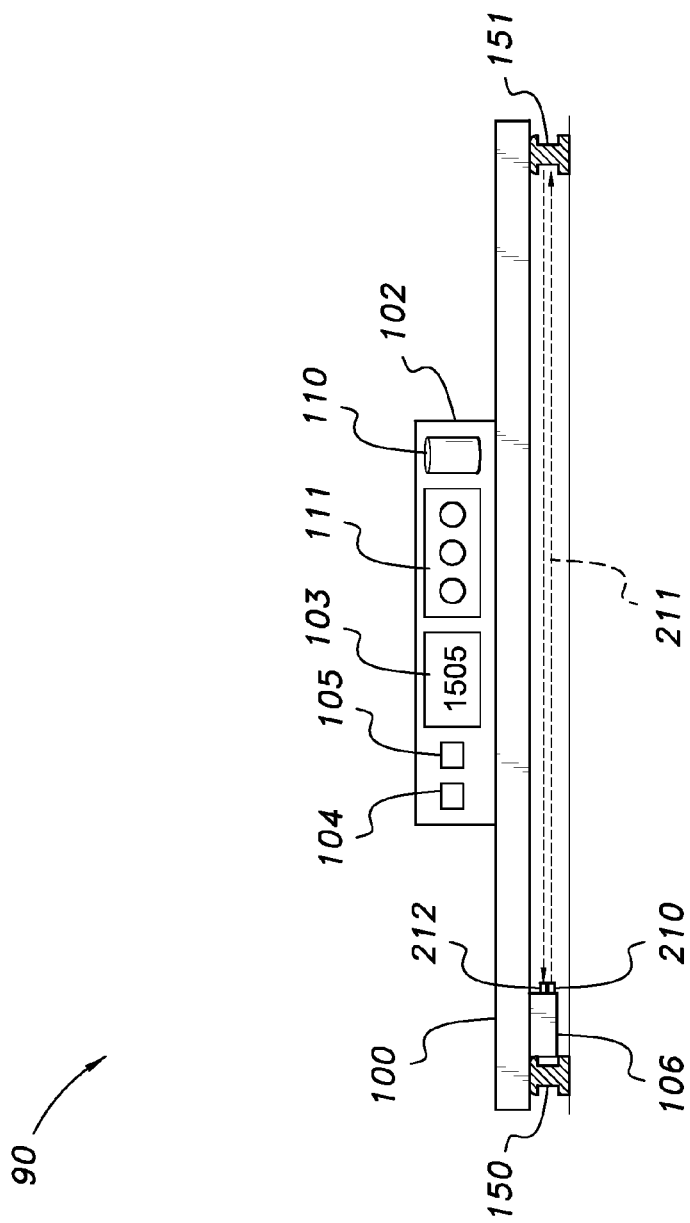
FIG. 8 shows an exemplar laser system for determining the distance between two rail sections.

In one non-contact-based distance sensing embodiment, the tool 90 uses a distance sensing system based on sound or light. This includes, but is not limited to ultrasonic, infrared, or laser distance systems. Such systems typically operate by timing the reflection of the sound or light projection off a surface. As depicted in FIG. 8, a non-contact-based distance sensing embodiment could include a system body 100, a laser emitter 210 that projects a laser beam 211 against a rail 151, and a laser detector 212 that detects its time-of-flight. The time-of-flight can be then be translated into a distance between rails. In various embodiments, the laser emitter 210 and/or laser detector 212 are also vertically adjustable so that the laser can be made to target a specific area of the rail so that measurements are consistent from rail to rail.

In addition to the time-of-flight laser distance measurement method for lasers, other embodiments may use alternative established techniques for laser distance measurement. These include techniques such as beam-modulation telemetry or interferometry. Original equipment manufacturer (OEM) modules for all three established techniques for laser distance measurement are available through a variety of vendors.

Figure 25:
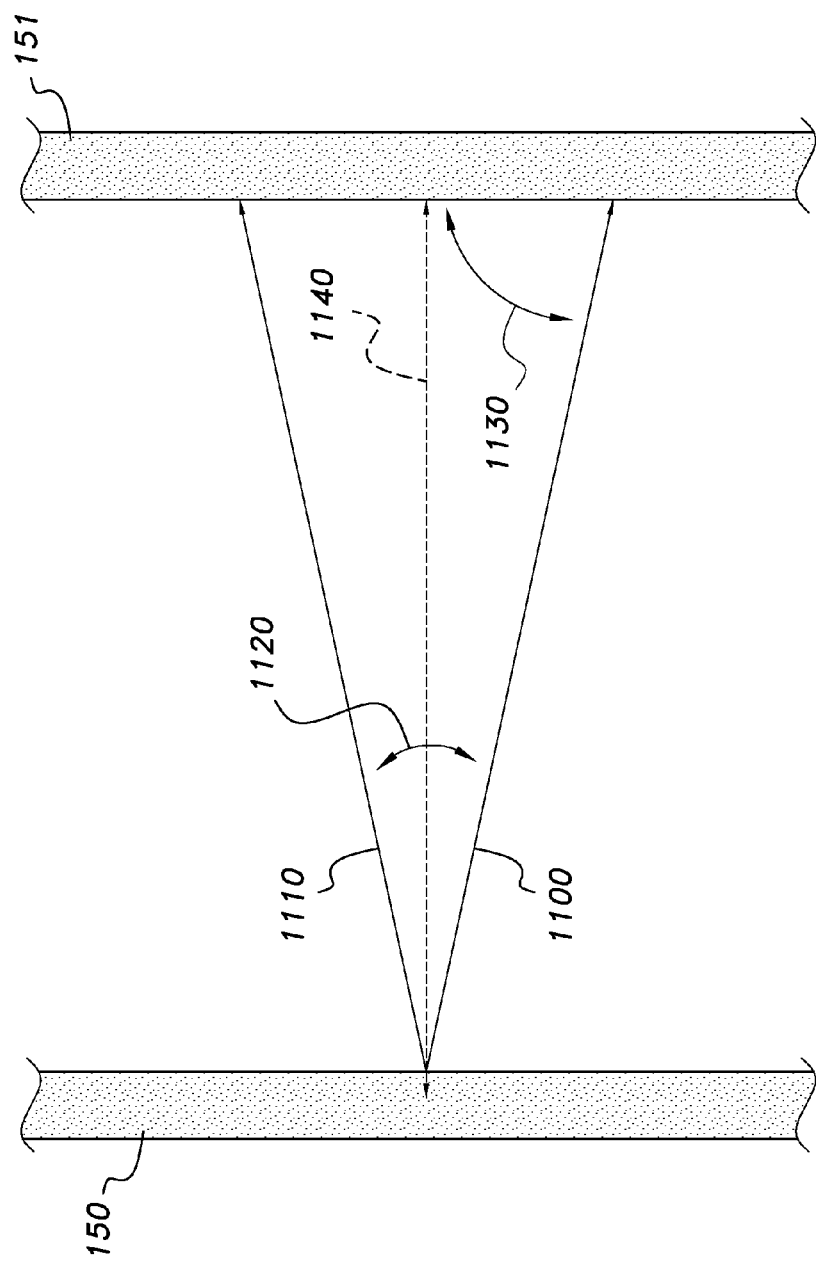
FIG. 25 shows a top view of one aspect of the present invention.

In another non-contact-based distance sensing embodiment, the tool 90 uses a distance sensing system based on two sound or light elements positioned at a fixed angle relative to each other. This distance sensing system allows for accurate rail distance measurements even if the body 100 is not perfectly perpendicular to the rails. As depicted in FIG. 25, since the fixed angle 1120 between the sensors is known, and the distances 1100 and 1110 derived from each distance sensor to the rail are known, the minimal or perpendicular distance 1140 between the rails (represented by numeric labels 150 and 151) can be calculated with basic trigonometry. This is accomplished by first finding the angle 1130 based off the known parameters (1120, 1100 and 1110), and then using the angle 1130 and known distance 1100 to calculate distance between the rails (1140) using the formula of distance*SIN (ANGLE).

In one embodiment, the distance sensing apparatus 106 (in any electronic form) is connected to a microcontroller 104 or other type of Computer Processing Unit (CPU) or electronic component or circuit that provides translation and/or filtering of the signal before providing it to the output device 103 or external system. Translation and/or filtering may include, but is not limited to, digital signal processing.

Output

Each embodiment in the tool 90 contains an output device 103. The output device may be any suitable type of visual, audible, or tactile electronic system, either in singular or combined configurations. For example, this may include a simple set of one or more LEDs, sounds, or a visual displays—all of which can be used to provide system output and thus operate as an output device 103.

In one embodiment, the tool 90 can provide means for internal output from the tool 90 to a user. In this case the output device 103, such as a display, is mounted in or about the system body 100. In another embodiment, the tool 90 can provide means for output to an external output device such as a PC. In this case, the output device 103 is not mounted in or about the system body 100, but connected to it in some fashion such as, but not limited to, a cable, USB connection, or radio signal. In yet another embodiment, the tool 90 may contain both internal and external output devices.

In one embodiment, the tool 90 includes an output system that can be configured according to the language and unit measurement system of the location in which the rail system operates or the user prefers. For example, a visual display system may provide the option of system output in selectable language such as Chinese, English, French, or German, as well as in a selectable unit format such as SI or Metric.

In another embodiment, the tool 90 contains user or factory-definable configuration options for railway track formats. For example, a customer that is located in a given locale may want the tool 90 to be configured for railway track distance and inclination formats that are specific to their railway. In the case of Chinese high-speed rail lines, for example, the railway track distance formats might be in the form of deviation above or below 1435 mm.

Microcontroller

In another embodiment, the tool 90 contains a microcontroller 104 or other type of Computer Processing Unit (CPU) in addition to the other system elements. The microcontroller 104 can be mounted in or about the body 100, or external to the body. In one embodiment, the microcontroller 104 and other system elements may be separate units that are connected electronically. In another embodiment, the microcontroller 104 may be a discrete part of a circuit board 102.

In one embodiment, the microcontroller 104 interoperates with the output device 103 and either the inclinometer 101 or distance sensing apparatus 106. In another embodiment, the microcontroller 104 interoperates with the output device 103 and both the inclinometer 101 and distance sensing arrangement.

The microcontroller 104 has computer code stored thereon to provide instructions to enable normal operation of the tool 90. These include, but are not limited to, interoperation and management of the tool 90 components, signal processing for the inclinometer 101, signal processing for the distance sensing apparatus 106, interoperation and management of the output device 103, interoperation and management with a memory device 105, electronic data storage and retrieval, and general computing tasks such as mathematical or logic processing, and timing operations.

Memory Device

In another embodiment, the tool 90 contains a memory device 105 or set of memory devices in addition to the other system elements. The memory device 105 or devices can include any suitable combination, including but not limited to FLASH memory, RAM memory, EEPROM memory, ROM memory, disk drive memory, and/or flash drive memory. Further, the memory device 105 or devices can be can be integrated into the tool 90 via internal or external means. For example, the system microcontroller 104 may contain both FLASH and RAM memory, but the system circuit 102 may contain an EEPROM chip.

In one embodiment, the memory device 105 is used to store volatile and/or temporary data for use by the microcontroller 104 or system. Examples of volatile and/or temporary data include, but are not limited to, system code variables or register data. In another embodiment the memory device 105 is used to store non-volatile or permanent data for use by the microcontroller 104 or system. Examples of non-volatile and/or permanent data include, but are not limited to, system initialization data or calibration and configuration data.

In one embodiment, the memory device 105 is a permanent part of the tool 90. Examples of permanent memory devices include but are not limited to EEPROM chips soldered to the system circuit 102. In another embodiment, the memory device 105 is a temporary part of the tool 90. Examples of temporary memory devices include but are not limited to USB Flash Drives that can be connected to the system circuit 102 via a USB port 112. In one embodiment, the memory device 105 can operate as a mass storage device (MSD). A mass storage device can typically interoperate with a personal computer.

Power Source

The tool 90 is typically powered by a power source 110. In one embodiment, the power source may be a source such as a battery that is either external to the tool 90, or integrated into or about the tool 90. In other embodiments, the power source may be a larger and more long lasting source such as a generator, or a fixed source such an electrical outlet. The power source 110 can be located, for example, in a housing 260 (see, e.g., FIG. 15). Alternatively, some system elements can be in a first housing 260a and the power source (such as a battery) located in a separate second housing 260b (see FIG. 6). The power source can also be located inside body 100 (see FIG. 26).

Input Device

In another embodiment, the tool 90 contains an input device 111 to control the tool 90. The input device 111 can be as simple as a button or set of buttons that initiate various system functions, or more complex like a display with a touch-screen.

Housing

In another embodiment, all electronic components are enclosed in a single housing mounted on or about the body 100 that is designed to protect the electronics from damage that can occur during use and/or from exposure to weather or moisture. In another embodiment, the various system elements are enclosed in multiple housings. For example, the distance sensing apparatus 106 could be in one housing (a first housing), the battery in a second housing, and the other electronic components could be in an additional housing (a third housing) located on the body 100. In the alternative, the distance sensing apparatus 106 and/or the battery and/or the other electronic components could be located inside the body 100 (see FIG. 26).

Field Calibration

In another embodiment, the tool 90 provides for the capability of field calibration. Field calibration typically comprises one or more system features, functions, or processes that allow the tool 90 to be configured into a certain state by a user in the field on more than one occasion. The state (or data) generated by the field calibration features or functions can optionally be stored in a memory device 105.

Figure 14:
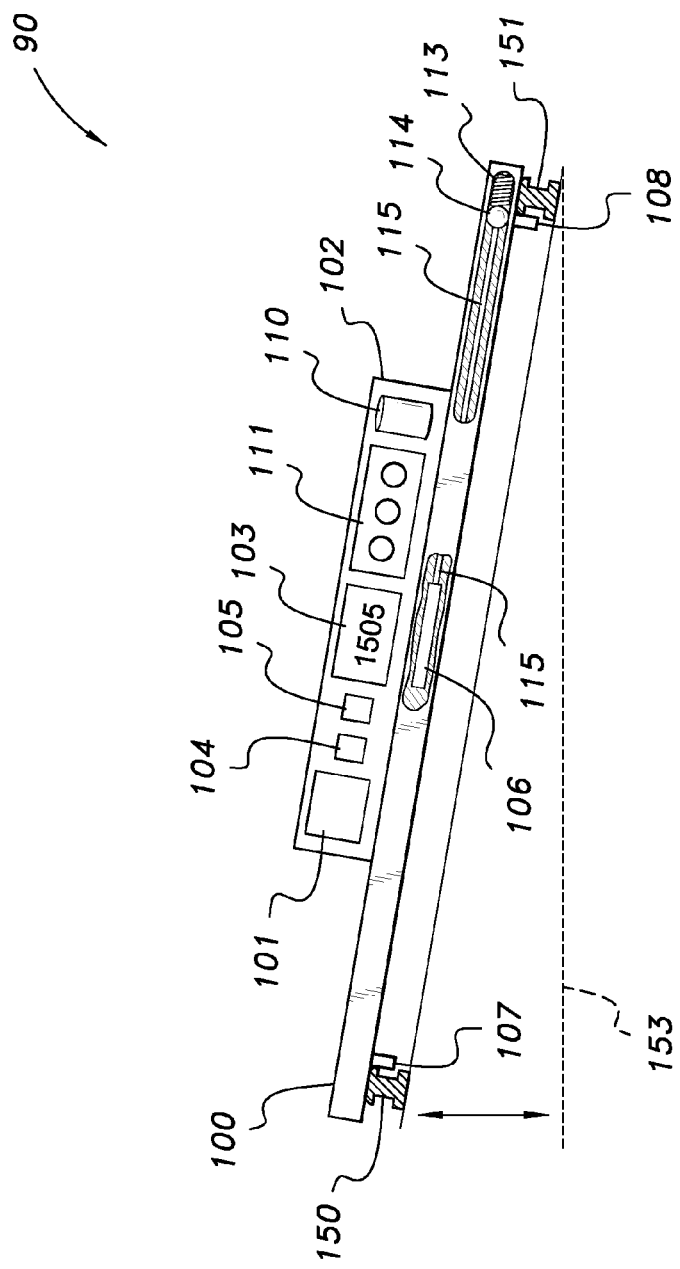
FIGS. 14 through 15 show a partially cutaway views of one aspect of the invention.
Figure 14A:
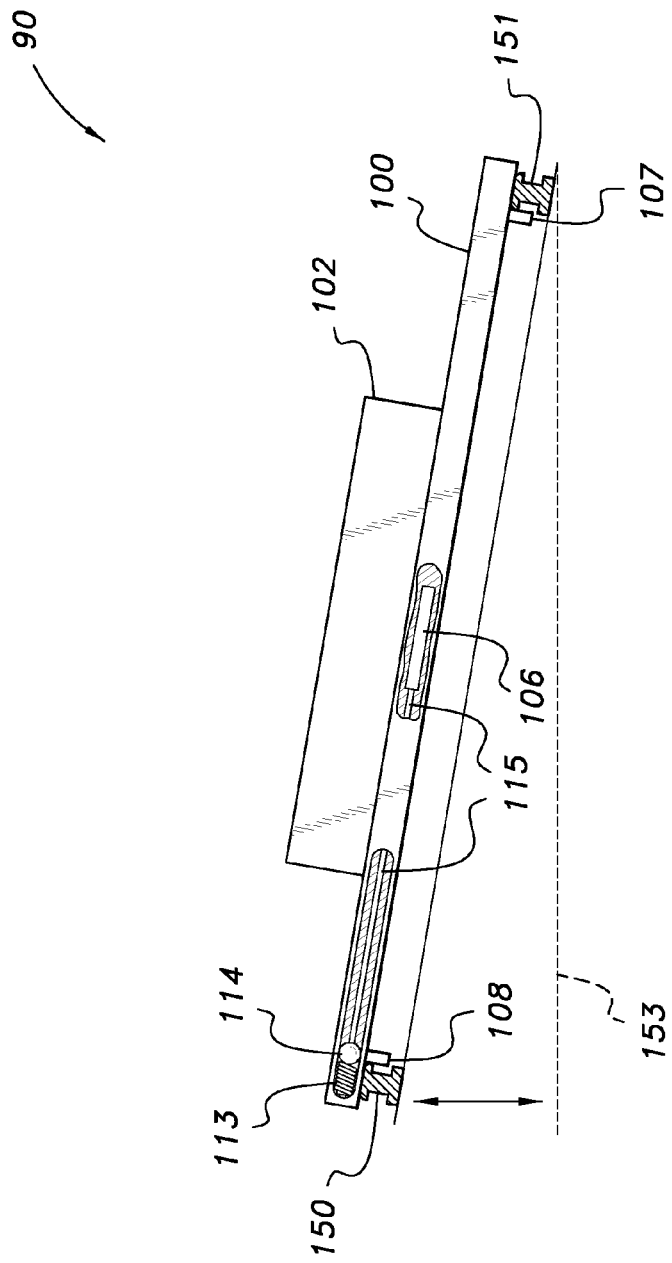

In one embodiment, the tool 90 provides a field calibration process that can detect inclinometer (or accelerometer) assembly error, and provide a means for compensation. Assembly error can result from a variety of factors, including but not limited to misalignment of the circuit board 102 containing the inclinometer 101 within the body 100, misalignment of the inclinometer 101 on the circuit board 102, and/or misalignment of the components within the inclinometer 101 itself. This field calibration procedure is designed to correct these errors by compensating for the error. For example, and as depicted in FIGS. 14 and 14A, this type of field calibration could include the following: (1) instructions to a user to position the system to capture a first set of positional data; (2) instructions to the user to turn the system 180 degrees to enable the system to capture a second set of positional data; and (3) an automated processing of the first and second sets of captured data to compensate for inclinometer (or accelerometer) alignment error.

Factory Configuration

In another embodiment, the tool 90 provides for the capability of factory configuration. Factory configuration typically consists of one or more system features, functions, or processes that allow the tool 90 to be configured into a certain state by the factory. Factory configuration typically occurs once in the factory during manufacturing, but is by no means limited to one occurrence, or limited only to a factory environment. The state (or data) generated by the factory configuration features, functions, or processes can optionally be stored in a memory device 105.

In one embodiment, the tool 90 provides a means for configuring the distance sensing apparatus 106. As an example, such a factory configuration could include performing one or more measurements at known distances to determine the how the electronic output from the distance sensing arrangement translates to an actual physical distances.

In one embodiment the tool 90 is provided with a procedure that allows factory configuration data to be input into the system. For example, accelerometers can be supplied with configuration data elements such as temperature-based offset and sensitivity coefficients (or data) to facilitate inclination calculations based on various ambient temperatures.

USB

Figure 15:
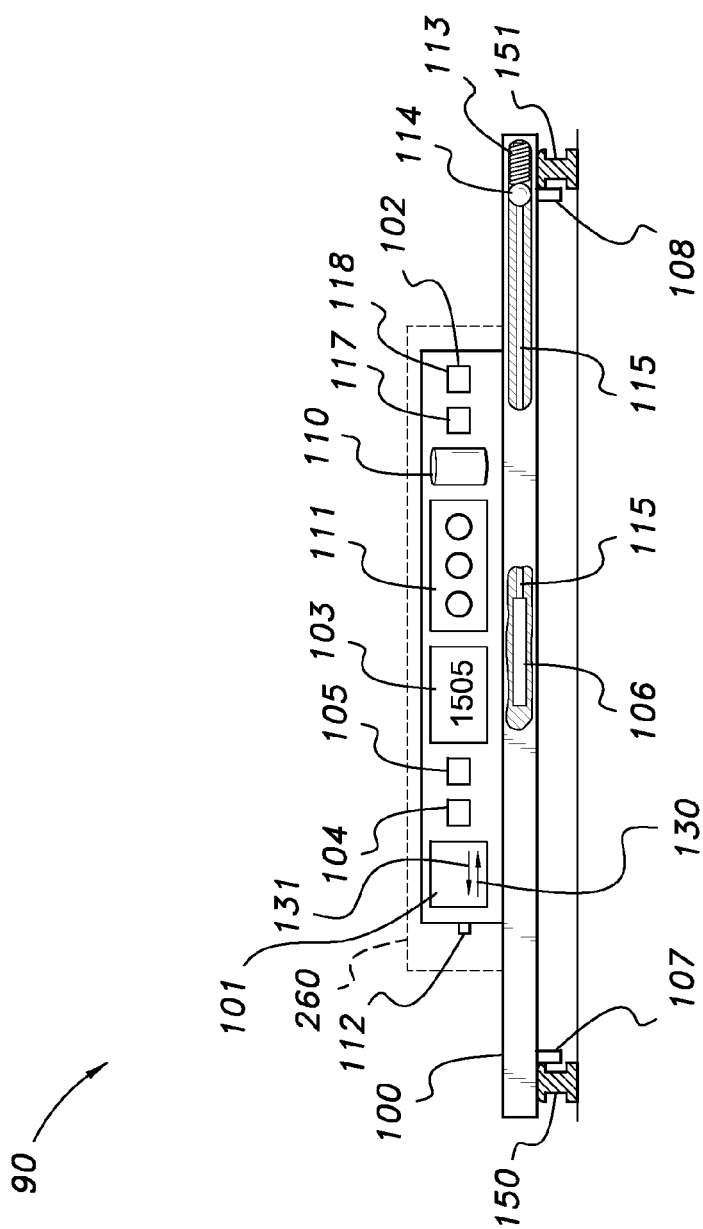

In another embodiment, the tool 90 contains a USB (Universal Serial Bus) or other similar computerized communication mechanism in addition to the other system elements. As depicted in FIG. 6 and FIG. 15, USB 112 allows the tool 90 to perform a variety of functions that involve communication with an external device or system. The USB 112 can be used to provide output from the inclinometer 101 and/or the distance sensing apparatus 106 to the external output device such as an external monitor or computer in real-time. The USB 112 can be used to communicate with another microcontroller 104 or memory device 105. Still further, the USB 112 can be used to upload and/or download data to and from the microcontroller 104 or memory device 105. In one embodiment, USB 112 can be used to load factory configuration or field calibration data into the inclinometer 101, distance sensing apparatus 106, microcontroller 104, or memory device 105. In one embodiment, the tool 90 can use USB to communicate with a computer that runs a software program that can work with the system. In one embodiment, the tool 90 can use USB 112 to communicate with a computer that recognizes the system memory device 105 as a mass storage device (MSD) similar to a flash drive. In another embodiment, the system 90 can use USB 112 to communicate with computing systems across a network or over the internet.

Data Logging, Storage, and Analysis

The tool 90 elements can operate together to log, store, and analyze data obtained by the system such as rail inclinations and/or distance between rails. For example, stored data such as rail inclinations or distances can be further associated with a time and date (generated and maintained by the system), and/or a name or serial number or other identifier (either generated by the system or a user). This combination of stored data and an identifier thus becomes a set of data that can later be received and analyzed as a group.

The data obtained by the tool 90 can be uploaded into another device, computer, or computer system via USB 112 or some other form of connectivity. As an example, this can include uploading data into something as simple as a PC with (or without) a computer application for Data Logging, Storage, and Analysis, or uploading to something more complex such as an Internet or Web-based system that can be used for Data Logging, Storage, and Analysis. In addition to USB, the form of connectivity from the tool 90 to another device or computer system can be another wired technology including but not limited to: an Ethernet computer network, or a wireless technology, including but not limited to: WiFi, Bluetooth™, Wide-Area Wireless, and Cellular Modem.

In one embodiment, the tool 90 contains the elements necessary to analyze the data collected by the system without an external computer. Examples of such analysis include but are not limited to, the ability to search for the measurements of a rail segment by serial number or name and recall and optionally display its data, or the ability to compare data associated with multiple rail segments.

Global Positioning

In another embodiment, the tool 90 contains a global positioning system device (GPSD) in addition to the other system elements. As depicted in FIG. 15, the GPSD 117 allows the system to automatically determine and store its global position based on a Global Positioning System. Positional knowledge is important because it allows individual rails, rail sections, or other railway elements to be associated with a physical location as well as the other system data elements (such as rail inclinations and/or rail distances). GPS positional data can include, but is not limited to latitude and longitude, altitude, time, and direction of travel. The combination of such data can be used for multiple purposes, including but not limited to rail or rail segment identification, data logging/analysis/retrieval, precision mapping, surveying, track layout and construction.

In one embodiment, the GPSD can be based off the standard US DOD NAVSTAR-GPS system. In other embodiments, the GPS may be based off the Russian GLONASS system, the European Galileo positioning system, the proposed COMPASS navigation system of China, the IRNSS of India, or any other such GPS system that may become available in the future. Further, various embodiments can contain multiple GPS systems that can be used individually or in combination.

In one embodiment, the GPSD 117 can be combined with an augmentation device 118 that further improves the accuracy, integrity, and availability of the GPS. Augmentation devices work off systems such as the US WAAS system (Wide Area Augmentation System), the European Geostationary Navigation Overlay Service (EGNOS) and the Japanese Multi-functional Satellite Augmentation System (MSAS).

Preferred Embodiment

In the preferred embodiment (depicted in FIGS. 9 and 24), the tool 90 comprises a body 100, a circuit board 102, a battery power source 110, a button-based input device 111, a microcontroller 104, a non-volatile memory device 105, a digital display output device 103, an inclinometer 101 and a distance sensing apparatus 106. All tool 90 elements are mounted in or about the body 100 with the distance sensing apparatus 106 positioned in or on the body 100 so that it can sense the distance between two rails, and the inclinometer 101 positioned either in or on the body 100 so that it can sense the inclination of the body 100 along the longitudinal axis with respect to the horizontal plane of gravity 153. In this embodiment, the distance sensing apparatus 106 is contained in its own rugged weather and water resistant housing; and all other electronics are contained in a separate housing (260 in FIG. 24). The electronics in both housings are connected through several wires.

In the preferred embodiment, the inclinometer 101 and distance sensing apparatus 106 can perform concurrent inclination and distance measurements across two or more rails and send formatted output to a digital display output device. Furthermore, the inclination and distance sensing capabilities can be used in combination to produce compound (or combined) data elements.

In the preferred embodiment (FIG. 9) the inclinometer 101 is comprised of one dual-axis accelerometer whose sensing elements 130 and 131 are mutually opposite in direction but are nevertheless oriented along the longitudinal axis of the body 100 with respect to the horizontal plane of gravity 153. This embodiment provides a greater amount of accuracy as the output from the two accelerometer sensing elements can be differentiated externally using differential measurement circuitry. The accuracy of inclination sensing from the accelerometer is further improved by providing both temperature-based and assembly error-based offset and sensitivity compensation. Temperature compensation is provided by recalculating the sensitivity and offset at a given temperature by applying the known offset and sensitivity compensation constants for that temperature. Likewise, assembly offset compensation is provided by recalculating the sensitivity and offset based on the assembly errors or misalignment in the tool 90. Moreover, and as depicted in FIGS. 14 and 14A, the system can use a simple method of field calibration to compensate for changes in accelerometer offset due to mounting or assembly error.

Figure 16:
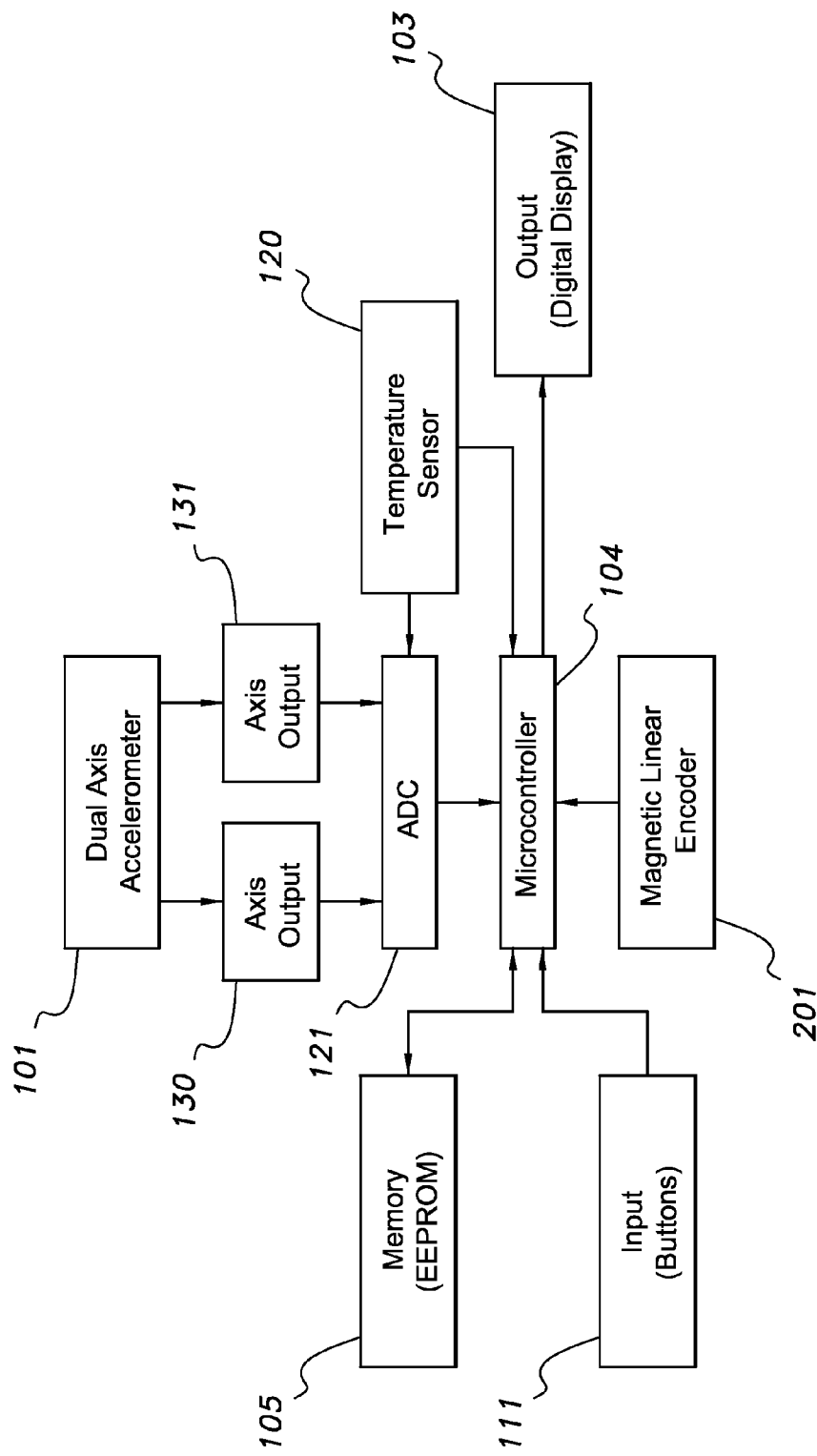
FIGS. 16 through 21 show logic flowcharts in accordance with the present invention.
Figure 17:
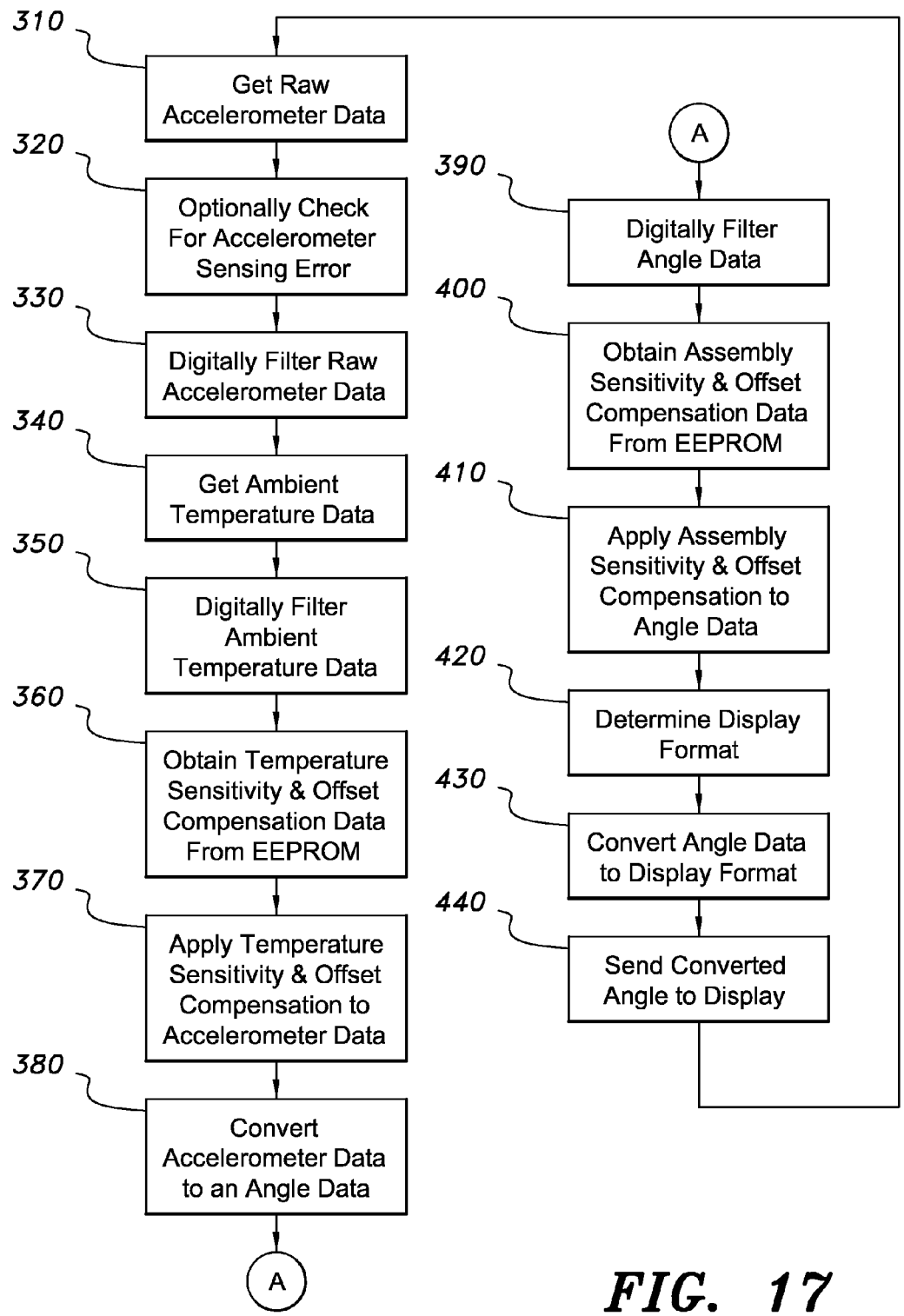

As depicted in the functional diagram on FIG. 16, the inclination sensing process starts when uncompensated analog signal output from the two accelerometer sensing axis' (130 and 131) is converted to digital signal format using an analog to digital converter or ADC 121. The ADC is also responsible for differential measurement between the two axes. This process further refines the accelerometer output into a single more accurate digital signal. The ADC-based digital signal is then provided to the microcontroller 104. The microcontroller 104 contains computer code that then processes and converts the ADC-based digital signal into angular data. This computer code process is documented in the inclination logic diagram in FIG. 17.

Figure 23:
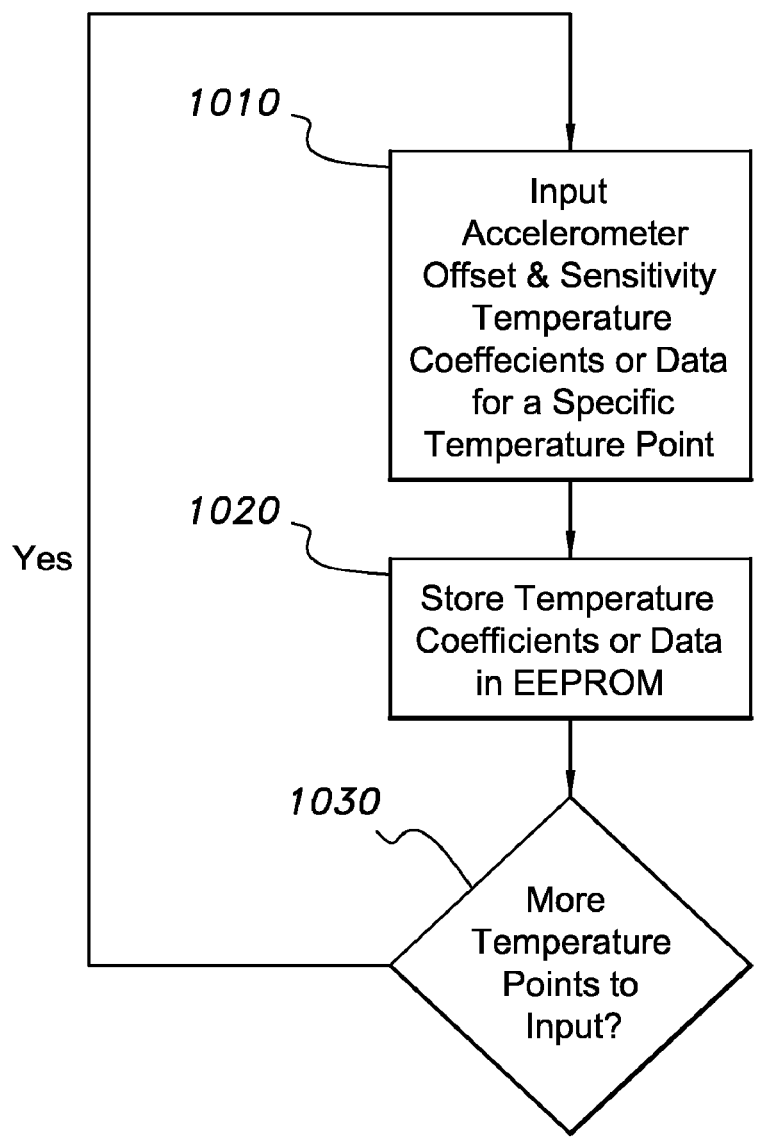
FIG. 23 shows a logic flowchart in accordance with the present invention.

The process begins with the raw digital accelerometer data from the ADC via the accelerometer at 310. Both the data and accelerometer are optionally evaluated at this point for error at 320, and appropriate action is taken if an error is recognized. Such error detection may also optionally take place during other portions of the inclination sensing process. If the raw accelerometer data is valid, then the data is digitally filtered at 330 to create a more stable and accurate signal. The digital filter process at 330 can use one or more DSP (digital signal processing) techniques, such as low pass filtering. The current ambient temperature is then taken from a temperature sensor (as depicted in FIG. 16, by numeric label "120"). The current ambient temperature data at 340 is then digitally filtered at 350 to create a more stable and accurate temperature signal. This digital filter process at 350 can also use one or more DSP techniques, such as low pass filtering. Temperature sensitivity and offset compensation coefficients or data are then obtained from EEPROM memory at 360, and applied against the digitally filtered accelerometer data based on the current ambient temperature at 370. The temperature compensation coefficients or data are typically unique to each accelerometer, and provide a known sensitivity and offset for that specific accelerometer component at several established temperature points within the operating temperature range for the tool 90. The temperature compensation coefficients or data are typically provided by the accelerometer vendor, and input during one of the Factory Configuration processes (FIG. 23). Optionally, temperature compensation coefficients may also be obtained independently through testing each unique accelerometer at established temperature points within the operating temperature range for the tool 90.

At this point in the inclination logic process, the accelerometer data, which has been digitally filtered and compensated for offset and sensitivity changes based on the current ambient temperature, is converted into angular or inclination data at 380. This angle data is then digitally filtered at 390 for stability and accuracy using one or more DSP techniques, such as low pass filtering. The code then obtains the assembly offset and sensitivity compensation data from EEPROM memory at 400. This compensation data was obtained during the Factory Configuration processes depicted in FIGS. 21, 22A, 22B, and 22C. This assembly compensation data serves to correct tool 90 assembly errors which can result from a variety of factors, including but not limited to misalignment of the circuit board 102 containing the inclinometer 101 with respect to the body 100, misalignment of the inclinometer 101 with respect to the circuit board 102, and/or misalignment of the components within the inclinometer 101 itself. The digitally filtered angle data is then modified to account for offset and sensitivity assembly error at 410. The angle data is then converted at 430 into the appropriate display format at 420 and sent at 440 to the digital display output device 103.

In the preferred embodiment (FIG. 9) the distance sensing apparatus 106 is comprised of a movable measuring element 108 that can traverse some portion of system body 100 and adjust for different rail distances. In this embodiment the tool 90 contains a fixed measuring point 107 on one side of the body 100 that contacts some portion of the first rail 150, and a movable measuring point (108) that can be adjustably positioned against some portion of a second opposing rail 151. Since the movable measuring point 108 can traverse along some portion of the system body 100, it can be adjusted to measure a wide variety of rail configurations.

The preferred distance sensing apparatus 106 is further comprised of a magnetic strip 200 with repeating poles at fixed distances and a magnetic linear encoder sensor 201 (see FIG. 7). In this configuration, the magnetic strip 200 and magnetic linear encoder sensor 201 are mounted to the system body 100 in a rugged weather resistant housing (represented by numeric label "106" in FIG. 9) in such a way that the traversal of the movable measuring point concurrently moves the magnetic strip 200 over the magnetic linear encoder sensor 201. This movement results in incremental signals that can be translated into a physical distance between the fixed measuring point 107 and the movable measuring point 108 and thus a distance between two rails.

As depicted in the functional diagram on FIG. 16, incremental position signals from the magnetic linear encoder sensor 201 are provided to the microcontroller 104. The microcontroller 104 contains computer code that then processes and coverts the incremental position signals into an actual physical distance. This computer code process is documented in the distance logic diagram in FIG. 18.

Figure 18:
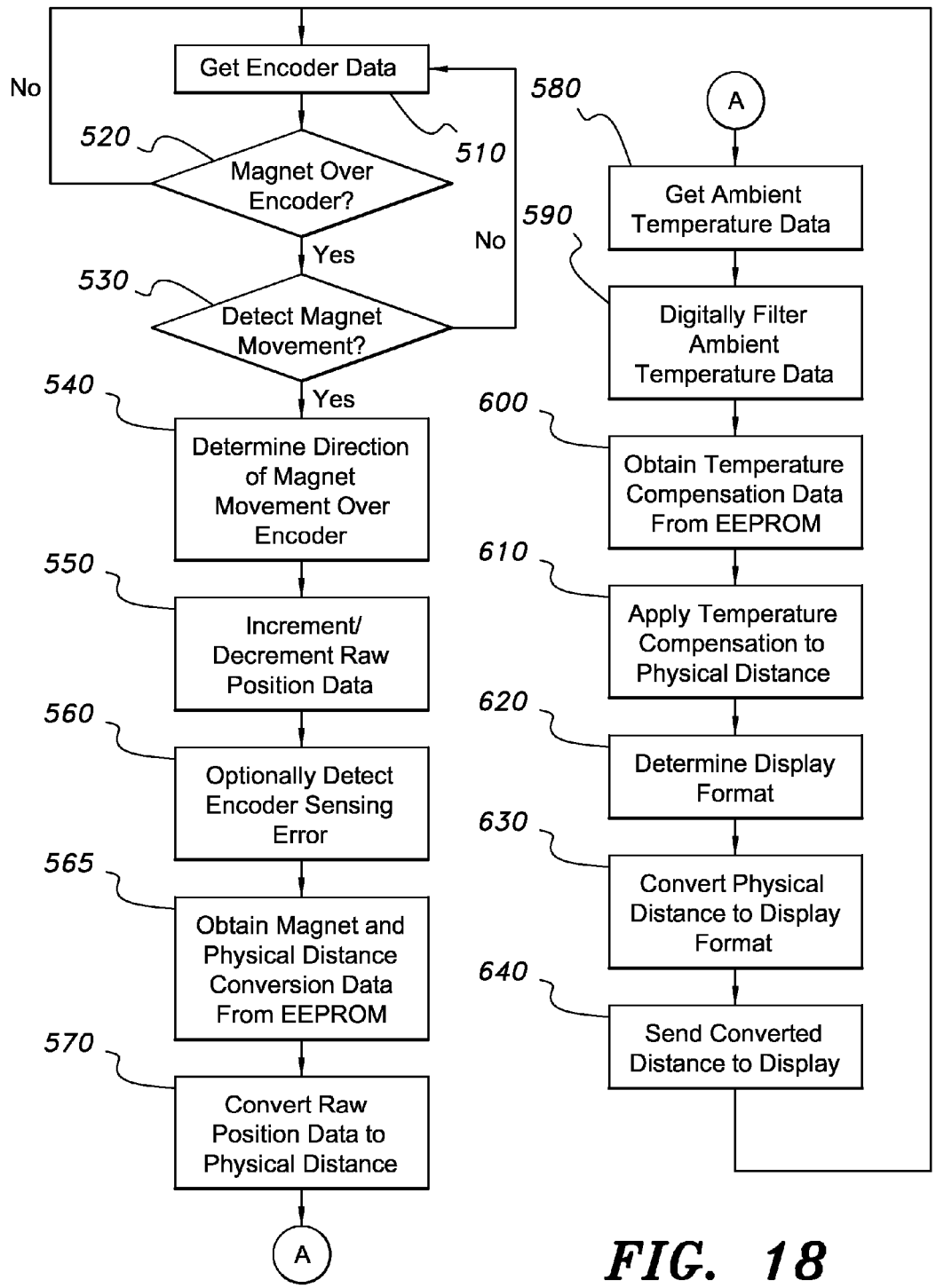

With reference to FIG. 18, the process begins with a determination of the magnet's position relative to the encoder at 520 based on the encoder data from 510. If the encoder does not sense a magnetic field, no attempt to obtain a distance measurement is invoked. Next, a determination of the magnet's movement over the encoder is obtained at 530. If no movement is detected, no attempt to obtain a distance measurement is invoked. Conversely, if the magnet is over the encoder, and movement is detected, the direction of that movement is calculated at 540, and the raw position of the magnet over the encoder is calculated at 550 as follows: the magnetic linear encoder 201 generates incremental signals as the magnetic strip 200 moves across it. These incremental signals can be accrued as the magnet moves forward, and decreased as the magnet moves backward. This process results in a positional value with respect to the position of magnetic strip across the encoder.

At this point in the distance logic, the encoder data, the direction of movement, and the position data are evaluated for error at 560, and appropriate action is taken if an error is recognized. Such error detection may also optionally take place during other portions of the distance sensing process. If the raw position data is valid, then magnet and physical distance conversion data are obtained from EEPROM memory at 565 (as depicted in FIG. 16, item 105). The magnet and physical distance conversion data is previously obtained during one or more of the Factory Configuration processes as defined in FIGS. 19 and 20. The magnet and physical distance conversion data are then applied against the encoder position and directional data at 570 to obtain a physical distance measurement of the movable measuring element 108 relative to the fixed measuring point 107.

The current ambient temperature is then taken from a temperature sensor (as depicted in FIG. 16, item 120). The current ambient temperature data at 580 is then digitally filtered at 590 to create a more stable and accurate temperature signal. The digital filter process 590 can also use one or more DSP techniques, such as low pass filtering. One or more temperature distance compensation coefficients are then obtained from EEPROM memory at 600 (as depicted in FIG. 16, item 105) and applied to the physical distance measurement at 610 based on the current ambient temperature. Such temperature compensation coefficients can include, but are not limited to, compensation data for expansion and contraction of system body 100 or other system elements. The display format is determined at 620. The distance data is then converted at 630 into the appropriate display format from 620 and sent at 640 to a display output device such as digital display output device 103 (shown, e.g., in FIG. 6).

In the preferred embodiment (FIG. 9), the battery power source 110 is a rechargeable battery, the input device 111 is button-based, and the digital display output device 103 is type of display that can be seen in both daylight and lowlight conditions, such as an Organic Light Emitting Display (OLED). In the preferred embodiment the train rail alignment and distance tool 90 is capable of sensing distance at a precision of 0.025 millimeters and inclination at an angle of 0.001 degrees.

The preferred embodiment provides for the capability of factory configuration. Factory configuration typically consists of one or more system features, functions, or processes that can be easily accomplished to setup, configure, or re-configure (to maintain) the tool 90 for use. Factory configurations typically take place at a known and stable ambient temperature so temperature-based compensation is not required during configuration.

Preferred Embodiment Factory Configurations for Angle Calculation

As previously noted, the accuracy of inclination sensing from the accelerometer is improved by providing both temperature-based and assembly error-based offset and sensitivity compensation. Temperature compensation is provided by recalculating the sensitivity and offset at a given temperature by applying the known offset and sensitivity compensation coefficients for that temperature. Likewise, assembly offset compensation is provided by recalculating the sensitivity and offset based on the assembly errors or misalignment in the tool 90.

Typically at least two factory configuration processes are required for accurate angle calculations. FIG. 23 depicts an example of a preferred embodiment of the factory configuration process logic for the input of temperature compensation coefficients, and FIGS. 21, 22A, 22B, and 22C depict an example of the preferred embodiment factory configuration process for capturing the accelerometer assembly offset and sensitivity compensation data.

FIG. 23 depicts the preferred embodiment factory configuration process logic for the input of temperature compensation coefficients. These temperature compensation coefficients are typically unique to each accelerometer, and provide a known sensitivity and offset for that specific accelerometer component at several established temperature points within the operating temperature range for the preferred embodiment. The temperature compensation coefficients may also be data that can be used to generate the temperature compensation coefficients within the preferred embodiment. As previously noted, the temperature compensation coefficients or data are typically provided by the accelerometer vendor, but may also be obtained independently through testing each unique accelerometer at established temperature points within the operating temperature range for the preferred embodiment. FIG. 23 depicts the first option, where the temperature compensation coefficients or data are provided by the accelerometer vendor. In FIG. 23, the process simply consists of inputting the accelerometer offset and sensitivity temperature coefficients or data at 1010 for each specific temperature point that has been provided by the accelerometer vendor, and storing them in EEPROM memory at 1020 for later use during tool 90 operation. This process continues until the data for each established temperature point has been entered and stored in EEPROM memory at 1030. This is done through the button-based input device 111.

Figure 21:
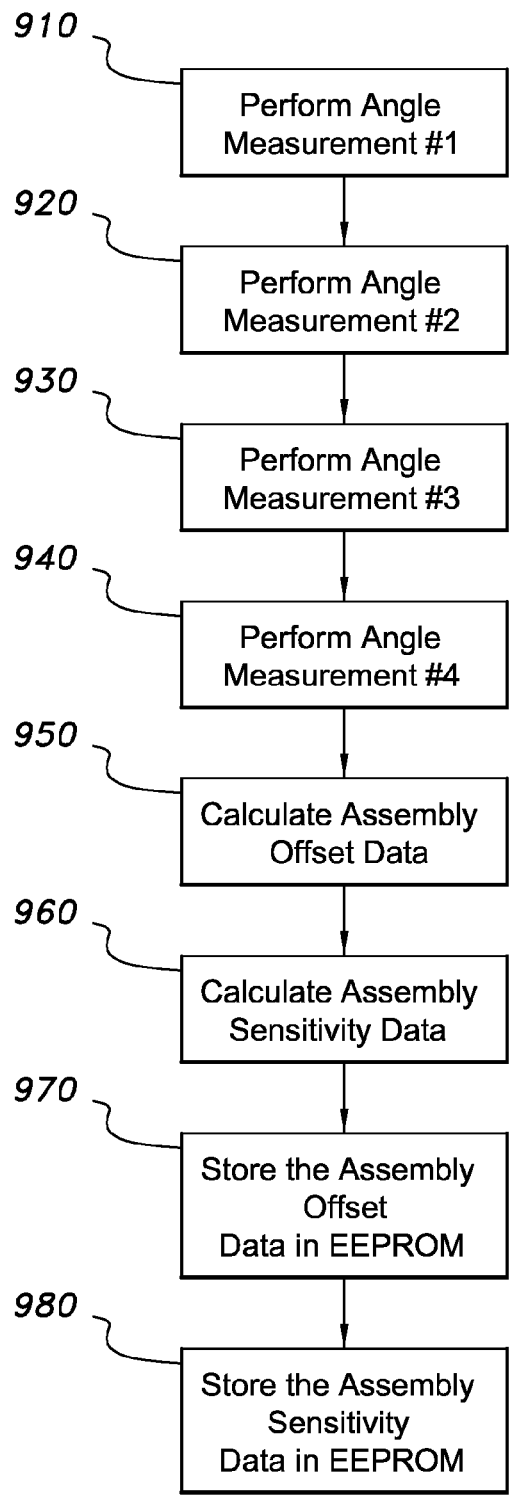
Figure 22:
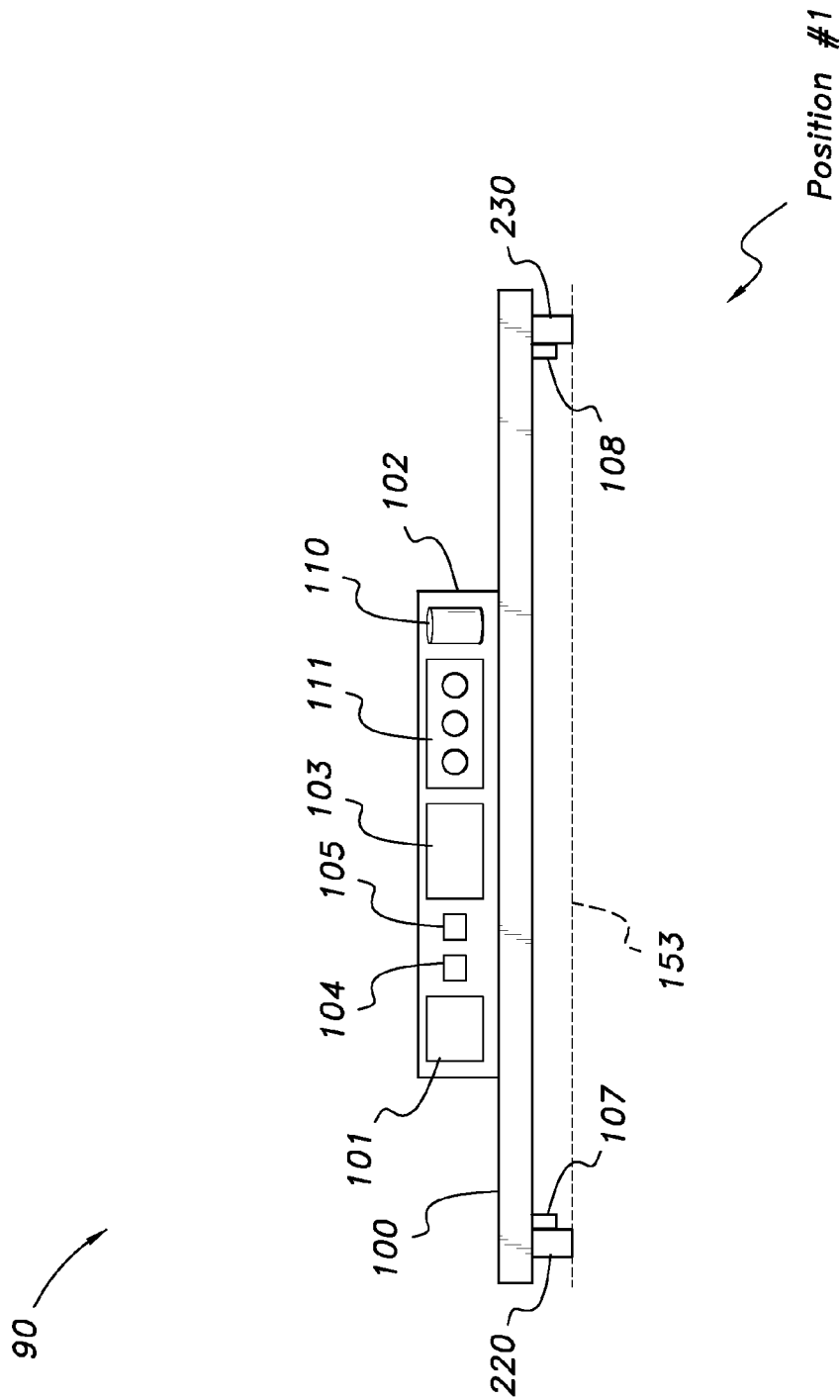
FIGS. 22 through 22C show various positions of one aspect of the present invention.
Figure 22C:
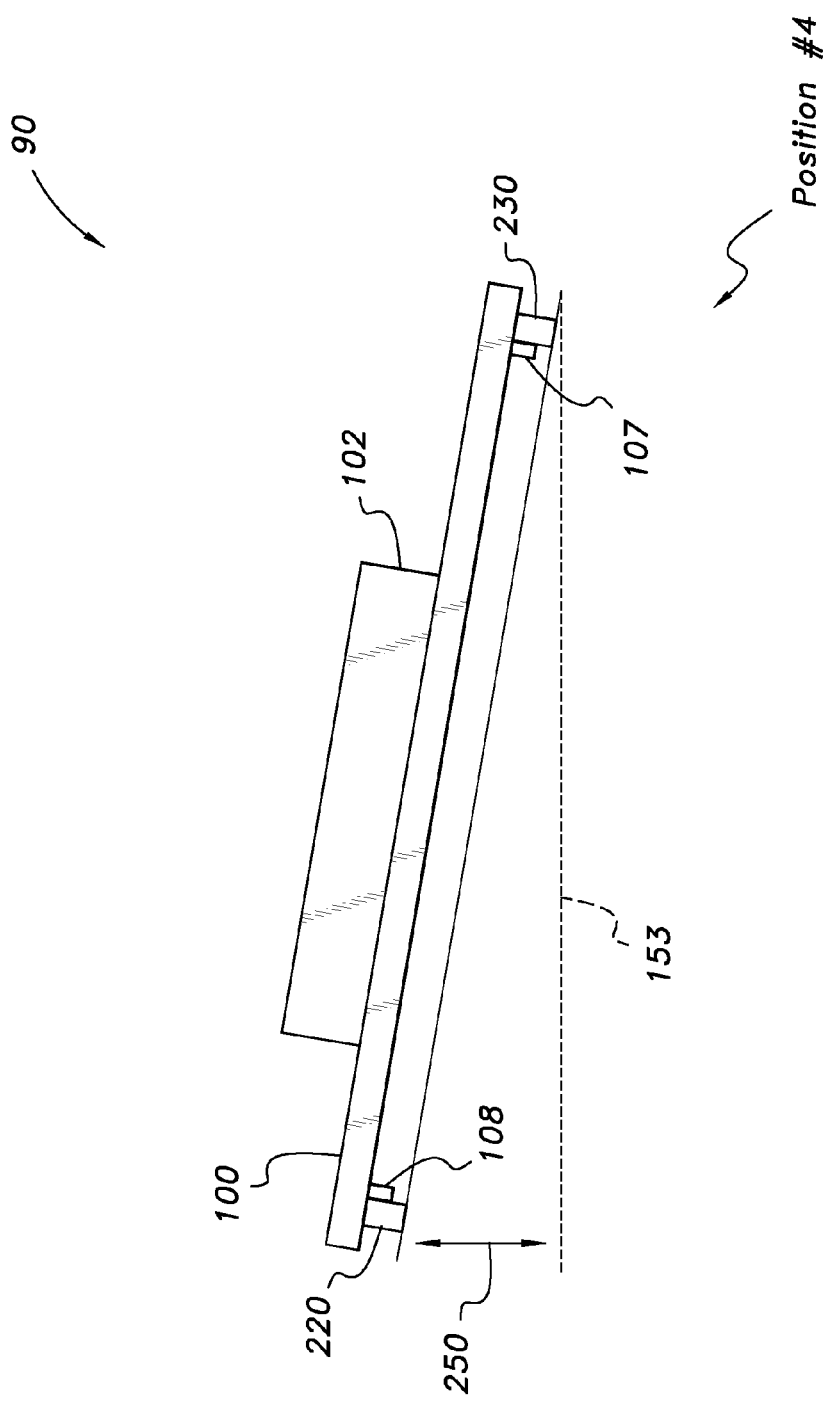

FIG. 21 depicts the preferred embodiment factory configuration process logic for capturing the accelerometer assembly offset and sensitivity compensation data. FIGS. 22, 22A, 22B, and 22C depict how the tool 90 is manipulated to capture this data during this process. The process begins by positioning the body 100 on a generally flat surface consisting of at least too stable points 220 and 230 along the longitudinal axis with respect to the horizontal plane of gravity 153. This is shown in FIG. 22 as "Position #1". At this point an angular measurement is taken (at 910 in FIG. 21). This measurement, as well as all others during this configuration process, is digitally filtered using some form of DSP, and compensated against the current ambient temperature with regards to temperature offset and sensitivity. Next, the body 100 is reversed and another angular measurement is taken (at 920 in FIG. 21). This is shown to in FIG. 22A as "Position #2". The process is then repeated by inclining the tool 90 (i.e., body 100) to an established and stable angle of inclination 250 with respect to the horizontal plane of gravity 153, and performing another angular measurement (at 930 in FIG. 21). This is shown in FIG. 22B as "Position #3". The final angular measurement (at 940 in FIG. 21) is accomplished at the same angle (250), but with the tool 90 again reversed. This is shown in FIG. 22C as "Position #4". The assembly offset is then calculated (at 950 in FIG. 21) based on a computational difference between Position #1 and Position #2, followed by the calculation of assembly sensitivity (at 960 in FIG. 21) based on Position #3 and Position #4. Both the assembly offset and assembly sensitivity are then stored in EEPROM memory (at 970 and 980 respectively in FIG. 21) for later use during system operation. It should also be noted that the order of these steps, and the inclination angle 250 of the tool 90 in positions #3 and #4 can be altered with simple coding changes.

Preferred Embodiment Factory Configurations for Distance Calculation

As previously noted, the magnetic linear encoder 201 generates incremental signals as the magnetic strip 200 moves across it. These incremental signals can be accrued as the magnet moves forward, and decreased as the magnet moves backward. This process results in a positional value with respect to the position of the magnetic strip 200 over the magnetic linear encoder 201. To determine a physical distance between the fixed measuring point 107 and the movable measuring point 108, at least one magnetic linear encoder 201 position measurement is associated with a known physical distance. This serves to map a physical distance measurement between the fixed measuring point 107 and the movable measuring point 108 to the encoder's 201 accumulated incremental signal with regards to the magnetic strip 200. Further, in order to calculate the distance to some other unmapped encoder 201 position, the smallest incremental movement of the magnetic strip 200 across the magnetic linear encoder 201 is calculated and translated into a physical unit of measurement. Thus, the combination of a least one encoder position measurement mapped to a known physical distance, and the calculated minimal physical unit of measurement produced by movement of the magnetic strip 200 across the magnetic linear encoder 201 permits the calculation of a physical distance at any point along the magnetic strip 200 and, correspondingly, between the fixed measuring point 107 and the movable measuring point 108.

Figure 19:
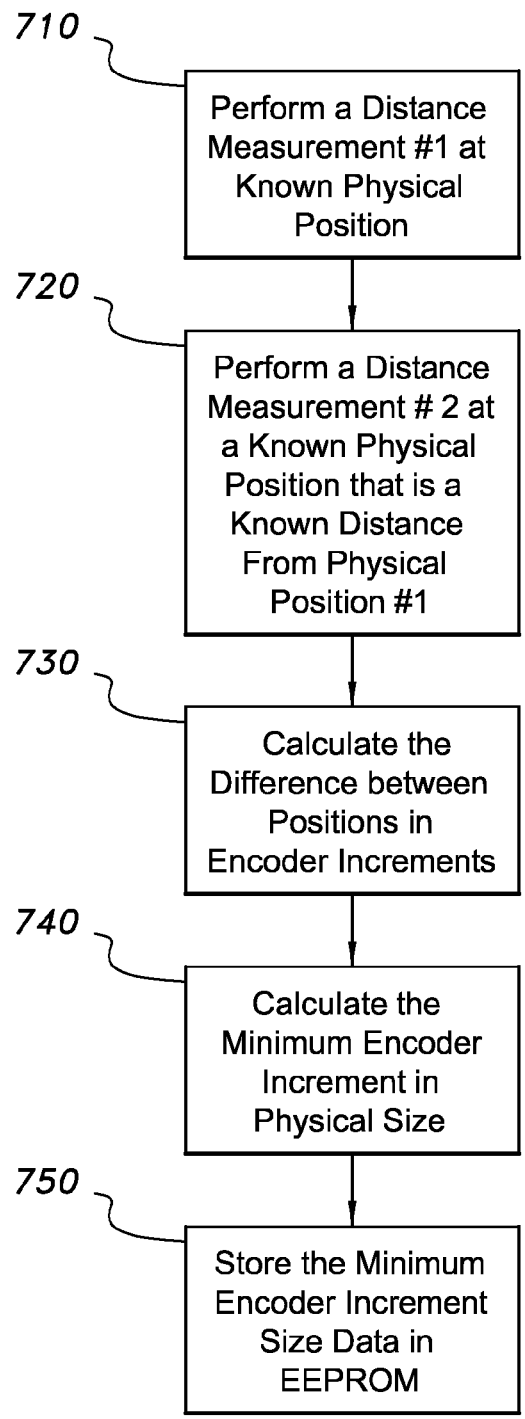

Typically two or more factory configuration processes are required for accurate distance calculations. FIG. 19 depicts the factory configuration process logic for determining the physical size of the smallest incremental positions, while FIG. 20 depicts the factory configuration process logic for mapping an encoder position measurement to a known physical distance.

FIG. 19 depicts the factory configuration process logic for determining the physical size of the smallest incremental positions (or units) on the magnetic strip 200 that can be recognized by the magnetic linear encoder 201. This process begins by taking a distance measurement at 710 using the magnetic linear encoder 201 at an established or known physical position. This is typically done at one end of the magnetic strip 200. This is followed by a second measurement at 720 at the other end of the magnetic strip 200 that is at a known physical distance away from the first position. The difference between the two positions is then calculated in "encoder units" at 730. "Encoder units" is simply the encoder's raw unconverted measurement between the first and second positions in incremental encoder units. Since the physical distance between the two positions is known, the encoder's raw unconverted measurement in encoder units is then converted into a distance in actual physical units (such as millimeters) at 740. This encoder-to-physical-measurement unit conversion is then stored in EEPROM memory at 750 for later use during system operation.

Figure 20:
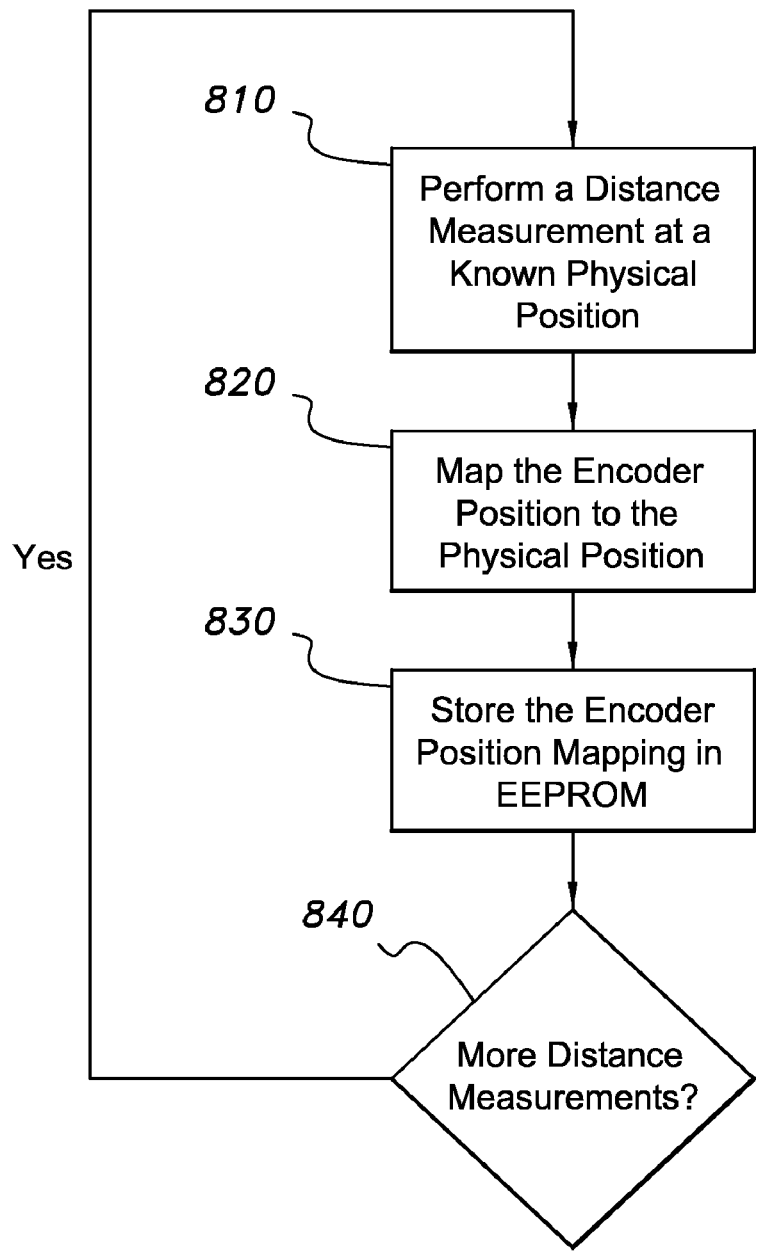

FIG. 20 depicts the factory configuration process logic for mapping an encoder position measurement to a known physical distance between the fixed measuring point 107 and the movable measuring point 108. This process begins by taking a distance measurement at 810 at a known physical distance. It is typical to use one of the industry standard distances between rails as the known physical distance. Next, the encoder position in encoder units is mapped to the physical distance at 820, and this data is stored in EEPROM memory at 830 for later use during system operation. It is also possible to store additional encoder units to physical distance mappings at other distances at 840.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed:

1. A train rail alignment and distance tool comprising:
an elongated body having first and second opposite ends with a fixed measuring point located proximate to the first end and a moveable measuring point proximate to the second end;
a battery power source;
a button-based input device;
a microcontroller;
a non-volatile memory device;
a digital display output device;
an inclinometer for measuring the angle of inclination of the body, wherein the angle of inclination is displayable on the digital display;
a distance sensing arrangement for measuring the distance between the fixed and moveable measuring points such that in normal use the fixed measuring point is placed against a first rail section and the moveable measuring point is contacted with a second rail section and one or more distance measurements are taken by the distance sensing arrangement and the resulting distance measurement outputted on the digital display output device; and
a means for communicating with an external device,
wherein the battery power source is operatively connected to the input device, microcontroller, memory device, output device, inclinometer and the distance sensing arrangement.

2. A train rail alignment and distance tool according to claim 1, wherein the means for communicating with an external device is a universal serial bus, and the external device is a computer.

3. A train rail alignment and distance tool comprising:
an elongated body having first and second opposite ends with a fixed measuring point located proximate to the first end and a moveable measuring point proximate to the second end;
a battery power source;
a button-based input device;
a microcontroller;
a non-volatile memory device;
a digital display output device;
an inclinometer for measuring the angle of inclination of the body, wherein the angle of inclination is displayable on the digital display;
a distance sensing arrangement for measuring the distance between the fixed and moveable measuring points such that in normal use the fixed measuring point is placed against a first rail section and the moveable measuring point is contacted with a second rail section and one or more distance measurements are taken by the distance sensing arrangement and the resulting distance measurement outputted on the digital display output device; and
a global positioning system device,
wherein the battery power source is operatively connected to the input device, microcontroller, memory device, output device, inclinometer and the distance sensing arrangement.

\* \* \* \* \*